United States Patent
Bhattacharya et al.

(10) Patent No.: US 10,439,929 B2
(45) Date of Patent: Oct. 8, 2019

(54) GRACEFUL RECOVERY OF A MULTICAST-ENABLED SWITCH

(71) Applicant: Avago Technologies International Sales Pte. Limited, Singapore (SG)

(72) Inventors: Indranil Bhattacharya, Bangalore (IN); Reshma Sudarshan, Cupertino, CA (US); Pani Ayyappa Durgam, Fremont, CA (US)

(73) Assignee: AVAGO TECHNOLOGIES INTERNATIONAL SALES PTE. LIMITED, Singapore (SG)

( * ) Notice: Subject to any disclaimer, the term of this patent is extended or adjusted under 35 U.S.C. 154(b) by 317 days.

(21) Appl. No.: 14/991,855

(22) Filed: Jan. 8, 2016

(65) Prior Publication Data
US 2017/0034047 A1    Feb. 2, 2017

Related U.S. Application Data

(60) Provisional application No. 62/199,931, filed on Jul. 31, 2015.

(51) Int. Cl.
*H04L 12/703* (2013.01)
*H04L 12/46* (2006.01)
*H04L 12/751* (2013.01)

(52) U.S. Cl.
CPC .......... *H04L 45/28* (2013.01); *H04L 12/4641* (2013.01); *H04L 45/02* (2013.01)

(58) Field of Classification Search
CPC ......... H04L 45/28; H04L 45/22; H04L 41/12; H04L 41/0668; H04L 45/02; H04L 41/0654
See application file for complete search history.

(56) References Cited

U.S. PATENT DOCUMENTS

| 829,529 A | 8/1906 | Keathley |
|---|---|---|
| 2,854,352 A | 9/1958 | Gronemeyer |

(Continued)

FOREIGN PATENT DOCUMENTS

| CN | 1735062 | 2/2006 |
|---|---|---|
| CN | 1777149 | 5/2006 |

(Continued)

OTHER PUBLICATIONS

Eastlake, D. et al., 'RBridges: TRILL Header Options', Dec. 24, 2009, pp. 1-17, TRILL Working Group.

(Continued)

*Primary Examiner* — Romani Ohri
(74) *Attorney, Agent, or Firm* — Xsensus LLP

(57) ABSTRACT

One embodiment of the present invention provides a switch. The switch includes a processor, a storage device, a multicast management module, and a graceful recovery module. The multicast management module participates in a multicast tree of a multicast group. The graceful recovery module determines a recovery event and constructs a message indicating the recovery event for a second switch. The switch and the second switch belong to a first virtual local area network (VLAN). The graceful recovery module then identifies a completion notification message from the second switch indicating a completion of replaying multicast information stored in the second switch and includes multicast information received from the second switch in a local multicast database.

20 Claims, 9 Drawing Sheets

(56) References Cited

U.S. PATENT DOCUMENTS

| | | |
|---|---|---|
| 5,390,173 A | 2/1995 | Spinney |
| 5,802,278 A | 9/1998 | Isfeld |
| 5,878,232 A | 3/1999 | Marimuthu |
| 5,879,173 A | 3/1999 | Poplawski |
| 5,959,968 A | 9/1999 | Chin |
| 5,973,278 A | 10/1999 | Wehrill, III |
| 5,983,278 A | 11/1999 | Chong |
| 5,995,262 A | 11/1999 | Hirota |
| 6,041,042 A | 3/2000 | Bussiere |
| 6,085,238 A | 7/2000 | Yuasa |
| 6,092,062 A | 7/2000 | Lohman |
| 6,104,696 A | 8/2000 | Kadambi |
| 6,122,639 A | 9/2000 | Babu |
| 6,185,214 B1 | 2/2001 | Schwartz |
| 6,185,241 B1 | 2/2001 | Sun |
| 6,295,527 B1 | 9/2001 | McCormack |
| 6,438,106 B1 | 8/2002 | Pillar |
| 6,498,781 B1 | 12/2002 | Bass |
| 6,542,266 B1 | 4/2003 | Phillips |
| 6,553,029 B1 | 4/2003 | Alexander |
| 6,571,355 B1 | 5/2003 | Linnell |
| 6,583,902 B1 | 6/2003 | Yuen |
| 6,633,761 B1 | 10/2003 | Singhal |
| 6,636,963 B1 | 10/2003 | Stein |
| 6,771,610 B1 | 8/2004 | Seaman |
| 6,816,462 B1 | 11/2004 | Booth, III |
| 6,870,840 B1 | 3/2005 | Hill |
| 6,873,602 B1 | 3/2005 | Ambe |
| 6,920,503 B1 | 7/2005 | Nanji |
| 6,937,576 B1 | 8/2005 | DiBenedetto |
| 6,956,824 B2 | 10/2005 | Mark |
| 6,957,269 B2 | 10/2005 | Williams |
| 6,975,581 B1 | 12/2005 | Medina |
| 6,975,864 B2 | 12/2005 | Singhal |
| 7,016,352 B1 | 3/2006 | Chow |
| 7,061,877 B1 | 6/2006 | Gummalla |
| 7,062,177 B1 | 6/2006 | Grivna |
| 7,097,308 B2 | 8/2006 | Kim |
| 7,173,934 B2 | 2/2007 | Lapuh |
| 7,197,308 B2 | 3/2007 | Singhal |
| 7,206,288 B2 | 4/2007 | Cometto |
| 7,274,694 B1 | 9/2007 | Cheng |
| 7,310,664 B1 | 12/2007 | Merchant |
| 7,313,637 B2 | 12/2007 | Tanaka |
| 7,315,545 B1 | 1/2008 | Chowdhury et al. |
| 7,316,031 B2 | 1/2008 | Griffith |
| 7,330,897 B2 | 2/2008 | Baldwin |
| 7,380,025 B1 | 5/2008 | Riggins |
| 7,397,768 B1 | 7/2008 | Betker |
| 7,397,794 B1 | 7/2008 | Lacroute |
| 7,430,164 B2 | 9/2008 | Bare |
| 7,453,888 B2 | 11/2008 | Zabihi |
| 7,477,894 B1 | 1/2009 | Sinha |
| 7,480,258 B1 | 1/2009 | Shuen |
| 7,508,757 B2 | 3/2009 | Ge |
| 7,558,195 B1 | 7/2009 | Kuo |
| 7,558,273 B1 | 7/2009 | Grosser |
| 7,571,447 B2 | 8/2009 | Ally |
| 7,599,901 B2 | 10/2009 | Mital |
| 7,653,056 B1 | 1/2010 | Dianes |
| 7,688,736 B1 | 3/2010 | Walsh |
| 7,688,960 B1 | 3/2010 | Aubuchon |
| 7,690,040 B2 | 3/2010 | Frattura |
| 7,706,255 B1 | 4/2010 | Kondrat et al. |
| 7,716,370 B1 | 5/2010 | Devarapalli |
| 7,720,076 B2 | 5/2010 | Dobbins |
| 7,729,296 B1 | 6/2010 | Choudhary |
| 7,787,480 B1 | 8/2010 | Mehta |
| 7,792,920 B2 | 9/2010 | Istvan |
| 7,796,593 B1 | 9/2010 | Ghosh |
| 7,801,021 B1 | 9/2010 | Triantafillis |
| 7,808,992 B2 | 10/2010 | Homchaudhuri |
| 7,836,332 B2 | 11/2010 | Hara |
| 7,843,906 B1 | 11/2010 | Chidambaram et al. |
| 7,843,907 B1 | 11/2010 | Abou-Emara |
| 7,860,097 B1 | 12/2010 | Lovett |
| 7,898,959 B1 | 3/2011 | Arad |
| 7,912,091 B1 | 3/2011 | Krishnan |
| 7,924,837 B1 | 4/2011 | Shabtay |
| 7,937,438 B1 | 5/2011 | Miller |
| 7,937,756 B2 | 5/2011 | Kay |
| 7,945,941 B2 | 5/2011 | Sinha |
| 7,949,638 B1 | 5/2011 | Goodson |
| 7,957,386 B1 | 6/2011 | Aggarwal |
| 8,018,938 B1 | 9/2011 | Fromm |
| 8,027,354 B1 | 9/2011 | Portolani |
| 8,054,832 B1 | 11/2011 | Shukla |
| 8,068,442 B1 | 11/2011 | Kompella |
| 8,078,704 B2 | 12/2011 | Lee |
| 8,090,805 B1 | 1/2012 | Chawla |
| 8,102,781 B2 | 1/2012 | Smith |
| 8,102,791 B2 | 1/2012 | Tang |
| 8,116,307 B1 | 2/2012 | Thesayi |
| 8,125,928 B2 | 2/2012 | Mehta |
| 8,134,922 B2 | 3/2012 | Elangovan |
| 8,155,150 B1 | 4/2012 | Chung |
| 8,160,063 B2 | 4/2012 | Maltz |
| 8,160,080 B1 | 4/2012 | Arad |
| 8,170,038 B2 | 5/2012 | Belanger |
| 8,195,774 B2 | 6/2012 | Lambeth |
| 8,194,674 B1 | 6/2012 | Pagel |
| 8,195,774 B2 | 6/2012 | Lambeth |
| 8,204,061 B1 | 6/2012 | Sane |
| 8,213,313 B1 | 7/2012 | Doiron |
| 8,213,336 B2 | 7/2012 | Smith |
| 8,230,069 B2 | 7/2012 | Korupolu |
| 8,239,960 B2 | 8/2012 | Frattura |
| 8,249,069 B2 | 8/2012 | Raman |
| 8,270,401 B1 | 9/2012 | Barnes |
| 8,295,291 B1 | 10/2012 | Ramanathan |
| 8,295,921 B2 | 10/2012 | Wang |
| 8,301,686 B1 | 10/2012 | Appajodu |
| 8,339,994 B2 | 12/2012 | Gnanasekaran |
| 8,351,352 B1 | 1/2013 | Eastlake |
| 8,369,335 B2 | 2/2013 | Jha |
| 8,369,347 B2 | 2/2013 | Xiong |
| 8,392,496 B2 | 3/2013 | Linden |
| 8,451,717 B2 | 5/2013 | Srikrishnan |
| 8,462,774 B2 | 6/2013 | Page |
| 8,465,774 B2 | 6/2013 | Page |
| 8,467,375 B2 | 6/2013 | Blair |
| 8,520,595 B2 | 8/2013 | Yadav |
| 8,553,710 B1 | 10/2013 | White |
| 8,595,479 B2 | 11/2013 | Radhakrishnan |
| 8,599,850 B2 | 12/2013 | Jha |
| 8,599,864 B2 | 12/2013 | Chung |
| 8,615,008 B2 | 12/2013 | Natarajan |
| 8,619,788 B1 | 12/2013 | Sankaran |
| 8,625,616 B2 | 1/2014 | Vobbilisetty |
| 8,705,526 B1 | 4/2014 | Hasan |
| 8,706,905 B1 | 4/2014 | McGlaughlin |
| 8,717,895 B2 | 5/2014 | Koponen |
| 8,724,456 B1 | 5/2014 | Hong |
| 8,792,501 B1 | 7/2014 | Rustagi |
| 8,798,045 B1 | 8/2014 | Aybay |
| 8,798,055 B1 | 8/2014 | An |
| 8,804,732 B1 | 8/2014 | Hepting |
| 8,804,736 B1 | 8/2014 | Drake |
| 8,806,031 B1 | 8/2014 | Kondur |
| 8,826,385 B2 | 9/2014 | Congdon |
| 8,918,631 B1 | 12/2014 | Kumar |
| 8,937,865 B1 | 1/2015 | Kumar |
| 8,948,181 B2 | 2/2015 | Kapadia |
| 8,971,173 B1 | 3/2015 | Choudhury |
| 8,995,272 B2 | 3/2015 | Agarwal |
| 9,019,976 B2 | 4/2015 | Gupta |
| 9,178,793 B1 | 11/2015 | Marlow |
| 9,231,890 B2 | 1/2016 | Vobbilisetty |
| 9,350,680 B2 | 5/2016 | Thayalan |
| 9,401,818 B2 | 7/2016 | Venkatesh |
| 9,438,447 B2 | 9/2016 | Basso |
| 9,450,870 B2 | 9/2016 | Ananthapadmanabha |
| 9,524,173 B2 | 12/2016 | Guntaka |
| 9,626,255 B2 | 4/2017 | Guntaka |

(56) References Cited

U.S. PATENT DOCUMENTS

| | | |
|---|---|---|
| 9,628,407 B2 | 4/2017 | Guntaka |
| 2001/0005527 A1 | 6/2001 | Vaeth |
| 2001/0055274 A1 | 12/2001 | Hegge |
| 2002/0019904 A1 | 2/2002 | Katz |
| 2002/0021701 A1 | 2/2002 | Lavian |
| 2002/0027885 A1 | 3/2002 | Ben-Ami |
| 2002/0039350 A1 | 4/2002 | Wang |
| 2002/0054593 A1 | 5/2002 | Morohashi |
| 2002/0087723 A1 | 7/2002 | Williams |
| 2002/0091795 A1 | 7/2002 | Yip |
| 2002/0138628 A1 | 9/2002 | Tingley |
| 2002/0161867 A1 | 10/2002 | Cochran |
| 2003/0026290 A1 | 2/2003 | Umayabashi |
| 2003/0041085 A1 | 2/2003 | Sato |
| 2003/0093567 A1 | 5/2003 | Lolayekar |
| 2003/0097464 A1 | 5/2003 | Martinez |
| 2003/0097470 A1 | 5/2003 | Lapuh |
| 2003/0123393 A1 | 7/2003 | Feuerstraeter |
| 2003/0152075 A1 | 8/2003 | Hawthorne |
| 2003/0174706 A1 | 9/2003 | Shankar |
| 2003/0189905 A1 | 10/2003 | Lee |
| 2003/0189930 A1 | 10/2003 | Terrell |
| 2003/0208616 A1 | 11/2003 | Laing |
| 2003/0216143 A1 | 11/2003 | Roese |
| 2003/0223428 A1 | 12/2003 | BlanquerGonzalez |
| 2003/0233534 A1 | 12/2003 | Bernhard |
| 2004/0001433 A1 | 1/2004 | Gram |
| 2004/0003094 A1 | 1/2004 | See |
| 2004/0010600 A1 | 1/2004 | Baldwin |
| 2004/0088668 A1 | 1/2004 | Bornowski |
| 2004/0037295 A1 | 2/2004 | Tanaka |
| 2004/0047349 A1 | 3/2004 | Fujita |
| 2004/0049699 A1 | 3/2004 | Griffith |
| 2004/0057430 A1 | 3/2004 | Paavolainen |
| 2004/0081171 A1 | 4/2004 | Finn |
| 2004/0088437 A1 | 5/2004 | Stimac |
| 2004/0095900 A1 | 5/2004 | Siegel |
| 2004/0117508 A1 | 6/2004 | Shimizu |
| 2004/0120326 A1 | 6/2004 | Yoon |
| 2004/0156313 A1 | 8/2004 | Hofmeister et al. |
| 2004/0165595 A1 | 8/2004 | Holmgren |
| 2004/0165596 A1 | 8/2004 | Garcia |
| 2004/0205234 A1 | 10/2004 | Barrack |
| 2004/0213232 A1 | 10/2004 | Regan |
| 2004/0225725 A1 | 11/2004 | Enomoto |
| 2004/0243673 A1 | 12/2004 | Goyal |
| 2005/0007951 A1 | 1/2005 | Lapuh |
| 2005/0025179 A1 | 2/2005 | McLaggan |
| 2005/0036488 A1 | 2/2005 | Kalkunte |
| 2005/0044199 A1 | 2/2005 | Shiga |
| 2005/0074001 A1 | 4/2005 | Mattes |
| 2005/0094568 A1 | 5/2005 | Judd |
| 2005/0094630 A1 | 5/2005 | Valdevit |
| 2005/0108375 A1 | 5/2005 | Hallak-Stamler |
| 2005/0111352 A1 | 5/2005 | Ho |
| 2005/0122979 A1 | 6/2005 | Gross |
| 2005/0152335 A1 | 7/2005 | Lodha |
| 2005/0157645 A1 | 7/2005 | Rabie et al. |
| 2005/0157751 A1 | 7/2005 | Rabie |
| 2005/0169188 A1 | 8/2005 | Cometto |
| 2005/0195813 A1 | 9/2005 | Ambe |
| 2005/0207423 A1 | 9/2005 | Herbst |
| 2005/0213561 A1 | 9/2005 | Yao |
| 2005/0220096 A1 | 10/2005 | Friskney |
| 2005/0259586 A1 | 11/2005 | Hafid |
| 2005/0265330 A1 | 12/2005 | Suzuki |
| 2005/0265356 A1 | 12/2005 | Kawarai |
| 2005/0278565 A1 | 12/2005 | Frattura |
| 2006/0007869 A1 | 1/2006 | Hirota |
| 2006/0018302 A1 | 1/2006 | Ivaldi |
| 2006/0023707 A1 | 2/2006 | Makishima |
| 2006/0034292 A1 | 2/2006 | Wakayama |
| 2006/0036648 A1 | 2/2006 | Frey |
| 2006/0039366 A1 | 2/2006 | Ghosh |
| 2006/0059163 A1 | 3/2006 | Frattura |
| 2006/0062187 A1 | 3/2006 | Rune |
| 2006/0072550 A1 | 4/2006 | Davis |
| 2006/0083172 A1 | 4/2006 | Jordan |
| 2006/0083254 A1 | 4/2006 | Ge |
| 2006/0092860 A1 | 5/2006 | Higashitaniguchi |
| 2006/0093254 A1 | 5/2006 | Mozdy |
| 2006/0098589 A1 | 5/2006 | Kreeger |
| 2006/0126511 A1 | 6/2006 | Youn |
| 2006/0140130 A1 | 6/2006 | Kalkunte |
| 2006/0155828 A1 | 7/2006 | Ikeda |
| 2006/0168109 A1 | 7/2006 | Warmenhoven |
| 2006/0184937 A1 | 8/2006 | Abels |
| 2006/0206655 A1 | 9/2006 | Chappell |
| 2006/0209886 A1 | 9/2006 | Silberman |
| 2006/0221960 A1 | 10/2006 | Borgione |
| 2006/0227776 A1 | 10/2006 | Chandrasekaran |
| 2006/0235995 A1 | 10/2006 | Bhatia |
| 2006/0242311 A1 | 10/2006 | Mai |
| 2006/0242398 A1 | 10/2006 | Fontijn |
| 2006/0245439 A1 | 11/2006 | Sajassi |
| 2006/0251067 A1 | 11/2006 | DeSanti |
| 2006/0256767 A1 | 11/2006 | Suzuki |
| 2006/0265515 A1 | 11/2006 | Shiga |
| 2006/0285499 A1 | 12/2006 | Tzeng |
| 2006/0291388 A1 | 12/2006 | Amdahl |
| 2006/0291480 A1 | 12/2006 | Cho |
| 2006/0294413 A1 | 12/2006 | Filz |
| 2007/0036178 A1 | 2/2007 | Hares |
| 2007/0061817 A1 | 3/2007 | Atkinson |
| 2007/0074052 A1 | 3/2007 | Hemmah |
| 2007/0081530 A1 | 4/2007 | Nomura |
| 2007/0083625 A1 | 4/2007 | Chamdani |
| 2007/0086362 A1 | 4/2007 | Kato |
| 2007/0094464 A1 | 4/2007 | Sharma |
| 2007/0097968 A1 | 5/2007 | Du |
| 2007/0098006 A1 | 5/2007 | Parry |
| 2007/0110068 A1 | 5/2007 | Sekiguchi |
| 2007/0116224 A1 | 5/2007 | Burke |
| 2007/0116422 A1 | 5/2007 | Reynolds |
| 2007/0121617 A1 | 5/2007 | Kanekar |
| 2007/0130295 A1 | 6/2007 | Rastogi |
| 2007/0156659 A1 | 7/2007 | Lim |
| 2007/0177525 A1 | 8/2007 | Wijnands |
| 2007/0177597 A1 | 8/2007 | Ju |
| 2007/0183313 A1 | 8/2007 | Narayanan |
| 2007/0183393 A1* | 8/2007 | Boyd ............ H04L 45/60 370/351 |
| 2007/0206762 A1 | 9/2007 | Chandra |
| 2007/0211712 A1 | 9/2007 | Fitch |
| 2007/0220059 A1 | 9/2007 | Lu |
| 2007/0226214 A1 | 9/2007 | Smits |
| 2007/0230472 A1 | 10/2007 | Jesuraj |
| 2007/0238343 A1 | 10/2007 | Velleca |
| 2007/0258449 A1 | 11/2007 | Bennett |
| 2007/0274234 A1 | 11/2007 | Kubota |
| 2007/0280223 A1 | 12/2007 | Pan |
| 2007/0286137 A1* | 12/2007 | Narasimhan ......... H04L 12/185 370/338 |
| 2007/0289017 A1 | 12/2007 | CopelandIII |
| 2007/0297406 A1 | 12/2007 | Rooholamini |
| 2008/0052487 A1 | 2/2008 | Akahane |
| 2008/0056300 A1 | 3/2008 | Williams |
| 2008/0057918 A1 | 3/2008 | Abrant |
| 2008/0065760 A1 | 3/2008 | Damm |
| 2008/0075078 A1 | 3/2008 | Watanabe |
| 2008/0080517 A1 | 4/2008 | Roy |
| 2008/0095160 A1 | 4/2008 | Yadav |
| 2008/0101386 A1 | 5/2008 | Gray |
| 2008/0112133 A1 | 5/2008 | Torudbakken |
| 2008/0112400 A1 | 5/2008 | Dunbar et al. |
| 2008/0133760 A1 | 6/2008 | Berkvens |
| 2008/0159260 A1 | 7/2008 | Vobbilisetty |
| 2008/0159277 A1 | 7/2008 | Vobbilisetty |
| 2008/0165705 A1 | 7/2008 | Umayabashi |
| 2008/0172492 A1 | 7/2008 | Raghunath |
| 2008/0181196 A1 | 7/2008 | Regan |
| 2008/0181243 A1 | 7/2008 | Vobbilisetty |
| 2008/0186968 A1 | 8/2008 | Farinacci |
| 2008/0186981 A1 | 8/2008 | Seto |

(56) References Cited

U.S. PATENT DOCUMENTS

| | | |
|---|---|---|
| 2008/0205377 A1 | 8/2008 | Chao |
| 2008/0219172 A1 | 9/2008 | Mohan |
| 2008/0225852 A1 | 9/2008 | Raszuk |
| 2008/0225853 A1 | 9/2008 | Melman |
| 2008/0228897 A1 | 9/2008 | Ko |
| 2008/0240129 A1 | 10/2008 | Elmeleegy |
| 2008/0253380 A1 | 10/2008 | Cazares |
| 2008/0267179 A1 | 10/2008 | Lavigne |
| 2008/0279196 A1 | 11/2008 | Friskney |
| 2008/0285458 A1 | 11/2008 | Lysne |
| 2008/0285555 A1 | 11/2008 | Ogasahara |
| 2008/0288020 A1 | 11/2008 | Einav |
| 2008/0298248 A1 | 12/2008 | Roeck |
| 2008/0304498 A1 | 12/2008 | Jorgensen |
| 2008/0304519 A1 | 12/2008 | Koenen |
| 2008/0310342 A1 | 12/2008 | Kruys |
| 2009/0022069 A1 | 1/2009 | Khan |
| 2009/0024734 A1 | 1/2009 | Merbach |
| 2009/0037607 A1 | 2/2009 | Farinacci |
| 2009/0037977 A1 | 2/2009 | Gai |
| 2009/0041046 A1 | 2/2009 | Hirata |
| 2009/0042270 A1 | 2/2009 | Dolly |
| 2009/0044270 A1 | 2/2009 | Shelly |
| 2009/0052326 A1 | 2/2009 | Bergamasco |
| 2009/0067422 A1 | 3/2009 | Poppe |
| 2009/0067442 A1 | 3/2009 | Killian |
| 2009/0079560 A1 | 3/2009 | Fries |
| 2009/0080345 A1 | 3/2009 | Gray |
| 2009/0083445 A1 | 3/2009 | Ganga |
| 2009/0092042 A1 | 4/2009 | Yuhara |
| 2009/0092043 A1 | 4/2009 | Lapuh |
| 2009/0094354 A1 | 4/2009 | Rastogi |
| 2009/0106298 A1 | 4/2009 | Furusho |
| 2009/0106405 A1 | 4/2009 | Mazarick |
| 2009/0113408 A1 | 4/2009 | Toeroe |
| 2009/0116381 A1 | 5/2009 | Kanda |
| 2009/0122700 A1 | 5/2009 | Aboba |
| 2009/0129384 A1 | 5/2009 | Regan |
| 2009/0129389 A1 | 5/2009 | DeFretay |
| 2009/0138577 A1 | 5/2009 | Casado |
| 2009/0138752 A1 | 5/2009 | Graham |
| 2009/0144720 A1 | 6/2009 | Roush |
| 2009/0161584 A1 | 6/2009 | Guan |
| 2009/0161670 A1 | 6/2009 | Shepherd |
| 2009/0168647 A1 | 7/2009 | Holness |
| 2009/0199177 A1 | 8/2009 | Edwards |
| 2009/0204965 A1 | 8/2009 | Tanaka |
| 2009/0213783 A1 | 8/2009 | Moreton |
| 2009/0213867 A1 | 8/2009 | Devireddy |
| 2009/0222879 A1 | 9/2009 | Kostal |
| 2009/0225752 A1 | 9/2009 | Mitsumori |
| 2009/0232031 A1 | 9/2009 | Vasseur |
| 2009/0245112 A1 | 10/2009 | Okazaki |
| 2009/0245137 A1 | 10/2009 | Hares |
| 2009/0245242 A1 | 10/2009 | Carlson |
| 2009/0246137 A1 | 10/2009 | Hadida |
| 2009/0249444 A1 | 10/2009 | Macauley |
| 2009/0252049 A1 | 10/2009 | Ludwig |
| 2009/0252061 A1 | 10/2009 | Small |
| 2009/0252503 A1 | 10/2009 | Ishigami |
| 2009/0260083 A1 | 10/2009 | Szeto |
| 2009/0279558 A1 | 11/2009 | Davis |
| 2009/0279701 A1 | 11/2009 | Moisand |
| 2009/0292858 A1 | 11/2009 | Lambeth |
| 2009/0316721 A1 | 12/2009 | Kanda |
| 2009/0323698 A1 | 12/2009 | LeFaucheur |
| 2009/0323708 A1 | 12/2009 | Ihle |
| 2009/0327392 A1 | 12/2009 | Tripathi |
| 2009/0327462 A1 | 12/2009 | Adams |
| 2010/0002382 A1 | 1/2010 | Aybay |
| 2010/0027420 A1 | 2/2010 | Smith |
| 2010/0027429 A1 | 2/2010 | Jorgens |
| 2010/0042869 A1 | 2/2010 | Szabo |
| 2010/0046471 A1 | 2/2010 | Hattori |
| 2010/0054260 A1 | 3/2010 | Pandey |
| 2010/0061269 A1 | 3/2010 | Banerjee |
| 2010/0074175 A1 | 3/2010 | Banks |
| 2010/0085981 A1 | 4/2010 | Gupta |
| 2010/0097941 A1 | 4/2010 | Carlson |
| 2010/0103813 A1 | 4/2010 | Allan |
| 2010/0103939 A1 | 4/2010 | Carlson |
| 2010/0114818 A1 | 5/2010 | Lier |
| 2010/0131636 A1 | 5/2010 | Suri |
| 2010/0157844 A1 | 6/2010 | Casey |
| 2010/0158024 A1 | 6/2010 | Sajassi |
| 2010/0165877 A1 | 7/2010 | Shukla |
| 2010/0165995 A1 | 7/2010 | Mehta |
| 2010/0168467 A1 | 7/2010 | Johnston |
| 2010/0169467 A1 | 7/2010 | Shukla |
| 2010/0169948 A1 | 7/2010 | Budko |
| 2010/0182920 A1 | 7/2010 | Matsuoka |
| 2010/0189119 A1 | 7/2010 | Sawada |
| 2010/0192225 A1 | 7/2010 | Ma |
| 2010/0195489 A1 | 8/2010 | Zhou |
| 2010/0195529 A1 | 8/2010 | Liu |
| 2010/0214913 A1 | 8/2010 | Kompella |
| 2010/0215042 A1 | 8/2010 | Sato |
| 2010/0215049 A1 | 8/2010 | Raza |
| 2010/0220724 A1 | 9/2010 | Rabie |
| 2010/0226368 A1 | 9/2010 | Mack-Crane |
| 2010/0226381 A1 | 9/2010 | Mehta |
| 2010/0246388 A1 | 9/2010 | Gupta |
| 2010/0246580 A1 | 9/2010 | Kaganoi |
| 2010/0254703 A1 | 10/2010 | Kirkpatrick |
| 2010/0257263 A1 | 10/2010 | Casado |
| 2010/0258263 A1 | 10/2010 | Douxchamps |
| 2010/0265849 A1 | 10/2010 | Harel |
| 2010/0271960 A1 | 10/2010 | Krygowski |
| 2010/0272107 A1 | 10/2010 | Papp |
| 2010/0281106 A1 | 11/2010 | Ashwood-Smith |
| 2010/0284414 A1 | 11/2010 | Agarwal |
| 2010/0284418 A1 | 11/2010 | Gray |
| 2010/0284698 A1 | 11/2010 | McColloch |
| 2010/0287262 A1 | 11/2010 | Elzur |
| 2010/0287548 A1 | 11/2010 | Zhou |
| 2010/0290464 A1 | 11/2010 | Assarpour |
| 2010/0290472 A1 | 11/2010 | Raman |
| 2010/0290473 A1 | 11/2010 | Enduri |
| 2010/0299527 A1 | 11/2010 | Arunan |
| 2010/0303071 A1 | 12/2010 | Kotalwar |
| 2010/0303075 A1 | 12/2010 | Tripathi |
| 2010/0303083 A1 | 12/2010 | Belanger |
| 2010/0309820 A1 | 12/2010 | Rajagopalan |
| 2010/0309912 A1 | 12/2010 | Mehta |
| 2010/0316055 A1 | 12/2010 | Belanger |
| 2010/0329110 A1 | 12/2010 | Rose |
| 2010/0329265 A1 | 12/2010 | Lapuh |
| 2011/0007738 A1 | 1/2011 | Berman |
| 2011/0019678 A1 | 1/2011 | Mehta |
| 2011/0032945 A1 | 2/2011 | Mullooly |
| 2011/0035489 A1 | 2/2011 | McDaniel |
| 2011/0035498 A1 | 2/2011 | Shah |
| 2011/0044339 A1 | 2/2011 | Kotalwar |
| 2011/0044352 A1 | 2/2011 | Chaitou |
| 2011/0051723 A1 | 3/2011 | Rabie |
| 2011/0058547 A1 | 3/2011 | Waldrop |
| 2011/0064086 A1 | 3/2011 | Xiong |
| 2011/0064089 A1 | 3/2011 | Hidaka |
| 2011/0072208 A1 | 3/2011 | Gulati |
| 2011/0085557 A1 | 4/2011 | Gnanasekaran |
| 2011/0085560 A1 | 4/2011 | Chawla |
| 2011/0085562 A1 | 4/2011 | Bao |
| 2011/0085563 A1 | 4/2011 | Kotha |
| 2011/0088011 A1 | 4/2011 | Ouali |
| 2011/0110266 A1 | 5/2011 | Li |
| 2011/0134802 A1 | 6/2011 | Rajagopalan |
| 2011/0134803 A1 | 6/2011 | Dalvi |
| 2011/0134924 A1 | 6/2011 | Hewson |
| 2011/0134925 A1 | 6/2011 | Safrai |
| 2011/0142053 A1 | 6/2011 | VanDerMerwe |
| 2011/0142062 A1 | 6/2011 | Wang |
| 2011/0149526 A1 | 6/2011 | Turner |
| 2011/0158113 A1 | 6/2011 | Nanda |
| 2011/0161494 A1 | 6/2011 | McDysan |

(56) References Cited

U.S. PATENT DOCUMENTS

| | | |
|---|---|---|
| 2011/0161695 A1 | 6/2011 | Okita |
| 2011/0176412 A1 | 7/2011 | Stine |
| 2011/0188373 A1 | 8/2011 | Saito |
| 2011/0194403 A1 | 8/2011 | Sajassi |
| 2011/0194563 A1 | 8/2011 | Shen |
| 2011/0225540 A1 | 9/2011 | d'Entremont |
| 2011/0228767 A1 | 9/2011 | Singla |
| 2011/0228780 A1 | 9/2011 | Ashwood-Smith |
| 2011/0231570 A1 | 9/2011 | Altekar |
| 2011/0231574 A1 | 9/2011 | Saunderson |
| 2011/0235523 A1 | 9/2011 | Jha |
| 2011/0243133 A9 | 10/2011 | Villait |
| 2011/0243136 A1 | 10/2011 | Raman |
| 2011/0246669 A1 | 10/2011 | Kanada |
| 2011/0249551 A1* | 10/2011 | Rollins ............... H04L 12/437 370/222 |
| 2011/0255538 A1 | 10/2011 | Srinivasan |
| 2011/0255540 A1 | 10/2011 | Mizrahi |
| 2011/0261828 A1 | 10/2011 | Smith |
| 2011/0268118 A1 | 11/2011 | Schlansker |
| 2011/0268120 A1 | 11/2011 | Vobbilisetty |
| 2011/0268125 A1 | 11/2011 | Vobbilisetty |
| 2011/0273988 A1 | 11/2011 | Tourrilhes |
| 2011/0273990 A1 | 11/2011 | Rajagopalan |
| 2011/0274114 A1 | 11/2011 | Dhar |
| 2011/0280572 A1 | 11/2011 | Vobbilisetty |
| 2011/0286357 A1 | 11/2011 | Haris |
| 2011/0286457 A1 | 11/2011 | Ee |
| 2011/0286462 A1 | 11/2011 | Kompella |
| 2011/0055274 A1 | 12/2011 | Hegge |
| 2011/0292947 A1 | 12/2011 | Vobbilisetty |
| 2011/0296052 A1 | 12/2011 | Guo |
| 2011/0299391 A1 | 12/2011 | Vobbilisetty |
| 2011/0299413 A1 | 12/2011 | Chatwani |
| 2011/0299414 A1 | 12/2011 | Yu |
| 2011/0299527 A1 | 12/2011 | Yu |
| 2011/0299528 A1 | 12/2011 | Yu |
| 2011/0299531 A1 | 12/2011 | Yu |
| 2011/0299532 A1 | 12/2011 | Yu |
| 2011/0299533 A1 | 12/2011 | Yu |
| 2011/0299534 A1 | 12/2011 | Koganti |
| 2011/0299535 A1 | 12/2011 | Vobbilisetty |
| 2011/0299536 A1 | 12/2011 | Cheng |
| 2011/0317559 A1 | 12/2011 | Kern |
| 2011/0317703 A1 | 12/2011 | Dunbar et al. |
| 2012/0011240 A1 | 1/2012 | Hara |
| 2012/0014261 A1 | 1/2012 | Salam |
| 2012/0014387 A1 | 1/2012 | Dunbar |
| 2012/0020220 A1 | 1/2012 | Sugita |
| 2012/0027017 A1 | 2/2012 | Rai |
| 2012/0033663 A1 | 2/2012 | Guichard |
| 2012/0033665 A1 | 2/2012 | Jacob |
| 2012/0033668 A1 | 2/2012 | Humphries |
| 2012/0033669 A1 | 2/2012 | Mohandas |
| 2012/0033672 A1 | 2/2012 | Page |
| 2012/0039163 A1 | 2/2012 | Nakajima |
| 2012/0042095 A1 | 2/2012 | Kotha |
| 2012/0063363 A1 | 3/2012 | Li |
| 2012/0075991 A1 | 3/2012 | Sugita |
| 2012/0099567 A1 | 4/2012 | Hart |
| 2012/0099602 A1 | 4/2012 | Nagapudi |
| 2012/0099863 A1 | 4/2012 | Xu |
| 2012/0102160 A1 | 4/2012 | Breh |
| 2012/0106339 A1 | 5/2012 | Mishra |
| 2012/0117438 A1 | 5/2012 | Shaffer |
| 2012/0131097 A1 | 5/2012 | Baykal |
| 2012/0131289 A1 | 5/2012 | Taguchi |
| 2012/0134266 A1 | 5/2012 | Roitshtein |
| 2012/0136999 A1 | 5/2012 | Roitshtein |
| 2012/0147740 A1 | 6/2012 | Nakash |
| 2012/0158997 A1 | 6/2012 | Hsu |
| 2012/0163164 A1 | 6/2012 | Terry |
| 2012/0170491 A1 | 7/2012 | Kern |
| 2012/0177039 A1 | 7/2012 | Berman |
| 2012/0210416 A1 | 8/2012 | Mihelich |
| 2012/0221636 A1 | 8/2012 | Surtani |
| 2012/0230225 A1 | 9/2012 | Matthews |
| 2012/0239918 A1 | 9/2012 | Huang |
| 2012/0243359 A1 | 9/2012 | Keesara |
| 2012/0243539 A1 | 9/2012 | Keesara |
| 2012/0250502 A1 | 10/2012 | Brolin |
| 2012/0260079 A1 | 10/2012 | Mruthyunjaya |
| 2012/0275297 A1 | 11/2012 | Subramanian |
| 2012/0275347 A1 | 11/2012 | Banerjee |
| 2012/0278804 A1 | 11/2012 | Narayanasamy |
| 2012/0281700 A1 | 11/2012 | Koganti |
| 2012/0287785 A1 | 11/2012 | Kamble |
| 2012/0294139 A1* | 11/2012 | Arai ..................... H04L 12/185 370/216 |
| 2012/0294192 A1 | 11/2012 | Masood |
| 2012/0294194 A1 | 11/2012 | Balasubramanian |
| 2012/0230800 A1 | 12/2012 | Kamble |
| 2012/0320800 A1 | 12/2012 | Kamble |
| 2012/0320926 A1 | 12/2012 | Kamath et al. |
| 2012/0327766 A1 | 12/2012 | Tsai et al. |
| 2012/0327937 A1 | 12/2012 | Melman et al. |
| 2013/0003535 A1 | 1/2013 | Sarwar |
| 2013/0003549 A1 | 1/2013 | Matthews |
| 2013/0003608 A1 | 1/2013 | Lei |
| 2013/0003737 A1 | 1/2013 | Sinicrope |
| 2013/0003738 A1 | 1/2013 | Koganti |
| 2013/0003747 A1 | 1/2013 | Raman |
| 2013/0016606 A1* | 1/2013 | Cirkovic ............. H04L 43/0811 370/225 |
| 2013/0028072 A1 | 1/2013 | Addanki |
| 2013/0034015 A1 | 2/2013 | Jaiswal |
| 2013/0034021 A1 | 2/2013 | Jaiswal |
| 2013/0034094 A1 | 2/2013 | Cardona |
| 2013/0044629 A1 | 2/2013 | Biswas |
| 2013/0054761 A1 | 2/2013 | Kempf |
| 2013/0058354 A1 | 3/2013 | Casado |
| 2013/0066947 A1 | 3/2013 | Ahmad |
| 2013/0067466 A1 | 3/2013 | Combs |
| 2013/0070762 A1 | 3/2013 | Adams |
| 2013/0083693 A1 | 4/2013 | Himura |
| 2013/0097345 A1 | 4/2013 | Munoz |
| 2013/0114595 A1 | 5/2013 | Mack-Crane et al. |
| 2013/0121142 A1* | 5/2013 | Bai ..................... H04L 12/1868 370/228 |
| 2013/0124707 A1 | 5/2013 | Ananthapadmanabha |
| 2013/0124750 A1 | 5/2013 | Anumala |
| 2013/0127848 A1 | 5/2013 | Joshi |
| 2013/0132296 A1 | 5/2013 | Manfred |
| 2013/0135811 A1 | 5/2013 | Dunwoody |
| 2013/0136123 A1 | 5/2013 | Ge |
| 2013/0145008 A1 | 6/2013 | Kannan |
| 2013/0148546 A1 | 6/2013 | Eisenhauer |
| 2013/0148663 A1 | 6/2013 | Xiong |
| 2013/0156425 A1 | 6/2013 | Kirkpatrick |
| 2013/0163591 A1 | 6/2013 | Shukla |
| 2013/0188489 A1* | 7/2013 | Sato ..................... H04L 49/555 370/235 |
| 2013/0194914 A1 | 8/2013 | Agarwal |
| 2013/0201992 A1 | 8/2013 | Masaki |
| 2013/0215754 A1 | 8/2013 | Tripathi |
| 2013/0219473 A1 | 8/2013 | Schaefer |
| 2013/0223221 A1 | 8/2013 | Xu |
| 2013/0223438 A1 | 8/2013 | Tripathi |
| 2013/0223449 A1 | 8/2013 | Koganti |
| 2013/0238802 A1 | 9/2013 | Sarikaya |
| 2013/0250947 A1 | 9/2013 | Zheng |
| 2013/0250951 A1 | 9/2013 | Koganti |
| 2013/0250958 A1 | 9/2013 | Watanabe |
| 2013/0259037 A1 | 10/2013 | Natarajan |
| 2013/0266015 A1 | 10/2013 | Qu |
| 2013/0268590 A1 | 10/2013 | Mahadevan |
| 2013/0272135 A1 | 10/2013 | Leong |
| 2013/0294451 A1 | 11/2013 | Li |
| 2013/0297757 A1 | 11/2013 | Han |
| 2013/0301425 A1 | 11/2013 | Chandra |
| 2013/0301642 A1 | 11/2013 | Radhakrishnan |
| 2013/0308492 A1 | 11/2013 | Baphna |
| 2013/0308641 A1 | 11/2013 | Ackley |
| 2013/0308647 A1 | 11/2013 | Rosset |

(56) References Cited

U.S. PATENT DOCUMENTS

| | | |
|---|---|---|
| 2013/0315125 A1 | 11/2013 | Ravishankar |
| 2013/0315246 A1 | 11/2013 | Zhang |
| 2013/0315586 A1 | 11/2013 | Kipp |
| 2013/0322427 A1 | 12/2013 | Stiekes |
| 2013/0329605 A1 | 12/2013 | Nakil |
| 2013/0332660 A1 | 12/2013 | Talagala |
| 2013/0336104 A1 | 12/2013 | Talla |
| 2013/0346583 A1 | 12/2013 | Low |
| 2014/0003427 A1* | 1/2014 | Nishi ............... H04L 45/16 370/390 |
| 2014/0010239 A1 | 1/2014 | Xu |
| 2014/0013324 A1 | 1/2014 | Zhang |
| 2014/0016639 A1* | 1/2014 | Ding ............... H04L 12/1886 370/390 |
| 2014/0019608 A1 | 1/2014 | Kawakami |
| 2014/0019639 A1 | 1/2014 | Ueno |
| 2014/0025736 A1 | 1/2014 | Wang |
| 2014/0029412 A1 | 1/2014 | Janardhanan |
| 2014/0029419 A1 | 1/2014 | Jain |
| 2014/0044126 A1 | 2/2014 | Sabhanatarajan |
| 2014/0050223 A1 | 2/2014 | Foo |
| 2014/0056298 A1 | 2/2014 | Vobbilisetty |
| 2014/0059225 A1 | 2/2014 | Gasparakis |
| 2014/0064056 A1 | 3/2014 | Sakata |
| 2014/0071987 A1 | 3/2014 | Janardhanan |
| 2014/0086253 A1 | 3/2014 | Yong |
| 2014/0092738 A1 | 4/2014 | Grandhi |
| 2014/0105034 A1 | 4/2014 | Huawei |
| 2014/0112122 A1 | 4/2014 | Kapadia |
| 2014/0140243 A1 | 5/2014 | Ashwood-Smith |
| 2014/0157251 A1 | 6/2014 | Hocker |
| 2014/0169368 A1 | 6/2014 | Grover |
| 2014/0188996 A1 | 7/2014 | Lie |
| 2014/0192804 A1 | 7/2014 | Ghanwani |
| 2014/0195695 A1 | 7/2014 | Okita |
| 2014/0241147 A1 | 8/2014 | Rajagopalan |
| 2014/0258446 A1 | 9/2014 | Bursell |
| 2014/0269415 A1* | 9/2014 | Banavalikar ......... H04L 12/185 370/254 |
| 2014/0269701 A1 | 9/2014 | Kaushik |
| 2014/0269709 A1 | 9/2014 | Benny |
| 2014/0269720 A1 | 9/2014 | Srinivasan |
| 2014/0269733 A1 | 9/2014 | Venkatesh |
| 2014/0273910 A1* | 9/2014 | Ballantyne ............. H04W 4/90 455/404.1 |
| 2014/0298091 A1 | 10/2014 | Carlen |
| 2014/0348168 A1 | 11/2014 | Singh |
| 2014/0355477 A1 | 12/2014 | Moopath |
| 2014/0362854 A1 | 12/2014 | Addanki |
| 2014/0362859 A1 | 12/2014 | Addanki |
| 2014/0376550 A1 | 12/2014 | Khan |
| 2015/0009992 A1 | 1/2015 | Zhang |
| 2015/0010007 A1 | 1/2015 | Matsuhira |
| 2015/0016300 A1 | 1/2015 | Devireddy |
| 2015/0030031 A1 | 1/2015 | Zhou |
| 2015/0092593 A1 | 4/2015 | Kompella |
| 2015/0103826 A1 | 4/2015 | Davis |
| 2015/0110111 A1 | 4/2015 | Song |
| 2015/0110487 A1 | 4/2015 | Fenkes |
| 2015/0117256 A1 | 4/2015 | Sabaa |
| 2015/0117454 A1 | 4/2015 | Koponen |
| 2015/0127618 A1 | 5/2015 | Alberti |
| 2015/0139234 A1 | 5/2015 | Hu |
| 2015/0143369 A1 | 5/2015 | Zheng |
| 2015/0172098 A1 | 6/2015 | Agarwal |
| 2015/0188753 A1 | 7/2015 | Anumala |
| 2015/0188770 A1 | 7/2015 | Naiksatam |
| 2015/0195093 A1 | 7/2015 | Ramasubramani |
| 2015/0222506 A1 | 8/2015 | Kizhakkiniyil |
| 2015/0248298 A1 | 9/2015 | Gavrilov |
| 2015/0263897 A1 | 9/2015 | Ganichev |
| 2015/0263899 A1 | 9/2015 | Tubaltsev |
| 2015/0263991 A1 | 9/2015 | MacChiano |
| 2015/0281066 A1 | 10/2015 | Koley |
| 2015/0301901 A1 | 10/2015 | Rath |
| 2015/0312091 A1* | 10/2015 | Yang ............... H04L 41/0668 370/221 |
| 2015/0347468 A1 | 12/2015 | Bester |
| 2016/0072899 A1 | 3/2016 | Tung |
| 2016/0087885 A1 | 3/2016 | Tripathi |
| 2016/0139939 A1 | 5/2016 | Bosch |
| 2016/0182458 A1 | 6/2016 | Shatzkamer |
| 2016/0212040 A1* | 7/2016 | Bhagavathiperumal ................ H04L 45/16 |
| 2016/0344640 A1 | 11/2016 | Soderlund |
| 2017/0012880 A1* | 1/2017 | Yang ............... H04L 12/6418 |
| 2017/0026197 A1 | 1/2017 | Venkatesh |
| 2017/0097841 A1 | 4/2017 | Chang |
| 2017/0155599 A1* | 6/2017 | Vobbilisetty ........ H04L 12/4625 |
| 2018/0013614 A1 | 1/2018 | Vobbilisetty |

FOREIGN PATENT DOCUMENTS

| | | |
|---|---|---|
| CN | 101064682 | 10/2007 |
| CN | 101459618 | 6/2009 |
| CN | 101471899 | 7/2009 |
| CN | 101548511 | 9/2009 |
| CN | 101645880 | 2/2010 |
| CN | 102098237 | 6/2011 |
| CN | 102148749 | 8/2011 |
| CN | 102301663 | 12/2011 |
| CN | 102349268 | 2/2012 |
| CN | 102378176 | 3/2012 |
| CN | 102404181 | 4/2012 |
| CN | 102415065 | 4/2012 |
| CN | 102415065 A | 4/2012 |
| CN | 102801599 | 11/2012 |
| CN | 102801599 A | 11/2012 |
| CN | 102088388 | 4/2014 |
| EP | 0579567 | 5/1993 |
| EP | 0579567 A2 | 1/1994 |
| EP | 0993156 | 4/2000 |
| EP | 0993156 A2 | 12/2000 |
| EP | 1398920 | 3/2004 |
| EP | 1398920 A2 | 3/2004 |
| EP | 1916807 A2 | 4/2008 |
| EP | 2001167 A1 | 10/2008 |
| EP | 2854352 | 4/2015 |
| EP | 2874359 | 5/2015 |
| WO | 2008056838 | 5/2008 |
| WO | 2009042919 | 4/2009 |
| WO | 2010111142 | 9/2010 |
| WO | 2010111142 A1 | 9/2010 |
| WO | 2011132568 | 10/2011 |
| WO | 2011140028 | 11/2011 |
| WO | 2011140028 A1 | 11/2011 |
| WO | 2012033663 | 3/2012 |
| WO | 2012093429 | 7/2012 |
| WO | 2014031781 | 2/2014 |

OTHER PUBLICATIONS

Perlman, Radia et al., 'RBridge VLAN Mapping', TRILL Working Group, Dec. 4, 2009, pp. 1-12.

Touch, J. et al., 'Transparent Interconnection of Lots of Links (TRILL): Problem and Applicability Statement', May 2009, Network Working Group, pp. 1-17.

Switched Virtual Networks. 'Internetworking Moves Beyond Bridges and Routers' Data Communications, McGraw Hill. New York, US, vol. 23, No. 12, Sep. 1, 1994 (Sep. 1, 1994), pp. 66-70,72,74, XP000462385 ISSN: 0363-6399.

Knight S et al: 'Virtual Router Redundancy Protocol' Internet Citation Apr. 1, 1998 (Apr. 1, 1998), XP002135272 Retrieved from the Internet: URL:ftp://ftp.isi.edu/in-notes/rfc2338.txt [retrieved on Apr. 10, 2000].

Office Action dated Jun. 18, 215, U.S. Appl. No. 13/098,490, filed May 2, 2011.

Perlman R: 'Challenges and opportunities in the design of TRILL: a routed layer 2 technology', 2009 IEEE Globecom Workshops, Honolulu, HI, USA, Piscataway, NJ, USA, Nov. 30, 2009 (Nov. 30, 2009), pp. 1-6, XP002649647, DOI: 10.1109/GLOBECOM.2009. 5360776 ISBN: 1-4244-5626-0 [retrieved on Jul. 19, 2011].

(56) References Cited

OTHER PUBLICATIONS

TRILL Working Group Internet-Draft Intended status: Proposed Standard RBridges: Base Protocol Specificaiton Mar. 3, 2010.
Office Action dated Jun. 16, 2015, U.S. Appl. No. 13/048,817, filed Mar. 15, 2011.
Knight P et al: 'Layer 2 and 3 Virtual Private Networks: Taxonomy, Technology, and Standardization Efforts', IEEE Communications Magazine, IEEE Service Center, Piscataway, US, vol. 42, No. 6, Jun. 1, 2004 (Jun. 1, 2004), pp. 124-131, XP001198207, ISSN: 0163-6804, DOI: 10.1109/MCOM.2004.1304248.
Office Action for U.S. Appl. No. 13/092,873, filed Apr. 22, 2011, dated Nov. 29, 2013.
Perlman, Radia et al., 'RBridges: Base Protocol Specification; Draft-ietf-trill-rbridge-protocol-16.txt', Mar. 3, 2010, pp. 1-117.
'An Introduction to Brocade VCS Fabric Technology', Brocade white paper, http://community.brocade.com/docs/DOC-2954, Dec. 3, 2012.
Brocade, 'Brocade Fabrics OS (FOS) 6.2 Virtual Fabrics Feature Frequently Asked Questions', pp. 1-6, 2009 Brocade Communications Systems, Inc.
Brocade, 'FastIron and TurboIron 24x Configuration Guide', Feb. 16, 2010.
Brocade, 'The Effortless Network: Hyperedge Technology for the Campus LAN' 2012.
Brocade 'Brocade Unveils 'The Effortless Network'', http://newsroom.brocade.com/press-releases/brocade-unveils-the-effortless-network-nasdaq-brcd-0859535, 2012.
Christensen, M. et al., 'Considerations for Internet Group Management Protocol (IGMP) and Multicast Listener Discovery (MLD) Snooping Switches', May 2006.
FastIron Configuration Guide Supporting Ironware Software Release 07.0.00, Dec. 18, 2009.
Foundary FastIron Configuration Guide, Software Release FSX 04.2.00b, Software Release FWS 04.3.00, Software Release FGS 05.0.00a, Sep. 2008.
Knight, 'Network Based IP VPN Architecture using Virtual Routers', May 2003.
Kreeger, L. et al., 'Network Virtualization Overlay Control Protocol Requirements draft-kreeger-nvo3-overlay-cp-00', Jan. 30, 2012.
Lapuh, Roger et al., 'Split Multi-link Trunking (SMLT)', draft-lapuh-network-smlt-08, Jul. 2008.
Lapuh, Roger et al., 'Split Multi-Link Trunking (SMLT)', Network Working Group, Oct. 2012.
Louati, Wajdi et al., 'Network-based virtual personal overlay networks using programmable virtual routers', IEEE Communications Magazine, Jul. 2005.
Narten, T. et al., 'Problem Statement: Overlays for Network Virtualization d raft-narten-n vo3-over l ay-problem -statement-01', Oct. 31, 2011.
Office Action for U.S. Appl. No. 13/092,752, filed Apr. 22, 2011, from Park, Jung H., dated Jul. 18, 2013.
Office Action for U.S. Appl. No. 13/351,513, filed Jan. 17, 2012, dated Jul. 24, 2014.
Office Action for U.S. Appl. No. 13/365,993, filed Feb. 3, 2012, from Cho, Hong Sol., dated Jul. 23, 2013.
Office Action for U.S. Appl. No. 13/742,207 dated Jul. 24, 2014, filed Jan. 15, 2013.
Office Action for U.S. Appl. No. 12/725,249, filed Mar. 16, 2010, dated Apr. 26, 2013.
Office Action for U.S. Appl. No. 12/950,968, filed Nov. 19, 2010, dated Jan. 4, 2013.
Office Action for U.S. Appl. No. 12/950,968, filed Nov. 19, 2010, dated Jun. 7, 2012.
Office Action for U.S. Appl. No. 12/950,974, filed Nov. 19, 2010, dated Dec. 20, 2012.
Office Action for U.S. Appl. No. 12/950,974, filed Nov. 19, 2010, dated May 24, 2012.
Office Action for U.S. Appl. No. 13/030,688, filed Feb. 18, 2011, dated Apr. 25, 2013.
Office Action for U.S. Appl. No. 13/030,806, filed Feb. 18, 2011, dated Dec. 3, 2012.
Office Action for U.S. Appl. No. 13/030,806, filed Feb. 18, 2011, dated Jun. 11, 2013.
Office Action for U.S. Appl. No. 13/042,259, filed Mar. 7, 2011, dated Mar. 18, 2013.
Office Action for U.S. Appl. No. 13/042,259, filed Mar. 7, 2011, dated Jul. 31, 2013.
Office Action for U.S. Appl. No. 13/044,301, filed Mar. 9, 2011, dated Feb. 22, 2013.
Office Action for U.S. Appl. No. 13/044,301, filed Mar. 9, 2011, dated Jun. 11, 2013.
Office Action for U.S. Appl. No. 13/044,326, filed Mar. 9, 2011, dated Oct. 2, 2013.
Office Action for U.S. Appl. No. 13/050,102, filed Mar. 17, 2011, dated Oct. 26, 2012.
Office Action for U.S. Appl. No. 13/050,102, filed Mar. 17, 2011, dated May 16, 2013.
Office Action for U.S. Appl. No. 13/087,239, filed Apr. 14, 2011, dated May 22, 2013.
Office Action for U.S. Appl. No. 13/092,460, filed Apr. 22, 2011, dated Jun. 21, 2013.
Office Action for U.S. Appl. No. 13/092,580, filed Apr. 22, 2011, dated Jun. 10, 2013.
Office Action for U.S. Appl. No. 13/092,701, filed Apr. 22, 2011, dated Jan. 28, 2013.
Office Action for U.S. Appl. No. 13/092,701, filed Apr. 22, 2011, dated Jul. 3, 2013.
Office Action for U.S. Appl. No. 13/092,724, filed Apr. 22, 2011, dated Feb. 5, 2013.
Office Action for U.S. Appl. No. 13/092,724, filed Apr. 22, 2011, dated Jul. 16, 2013.
Office Action for U.S. Appl. No. 13/092,752, filed Apr. 22, 2011, dated Feb. 5, 2013.
Office Action for U.S. Appl. No. 13/092,864, filed Apr. 22, 2011, dated Sep. 19, 2012.
Office Action for U.S. Appl. No. 13/092,873, filed Apr. 22, 2011, dated Jun. 19, 2013.
Office Action for U.S. Appl. No. 13/092,877, filed Apr. 22, 2011, dated Mar. 4, 2013.
Office Action for U.S. Appl. No. 13/092,877, filed Apr. 22, 2011, dated Sep. 5, 2013.
Office Action for U.S. Appl. No. 13/098,360, filed Apr. 29, 2011, dated May 31, 2013.
Office Action for U.S. Appl. No. 13/098,490, filed May 2, 2011, dated Jul. 9, 2013.
Office Action for U.S. Appl. No. 13/184,526, filed Jul. 16, 2011, dated Jan. 28, 2013.
Office Action for U.S. Appl. No. 13/184,526, filed Jul. 16, 2011, dated May 22, 2013.
Office Action for U.S. Appl. No. 13/365,808, Filing date Jul. 18, 2013, dated Jul. 18, 2013.
Perlman, Radia et al., 'Challenges and Opportunities in the Design of TRILL: a Routed layer 2 Technology', 2009.
S. Nadas et al., 'Virtual Router Redundancy Protocol (VRRP) Version 3 for IPv4 and IPv6', Internet Engineering Task Force, Mar. 2010.
'RBridges: Base Protocol Specification', IETF Draft, Perlman et al., Jun. 26, 2009.
U.S. Appl. No. 13/030,806 Office Action dated Dec. 3, 2012.
Office action dated Apr. 26, 2012, U.S. Appl. No. 12/725,249, filed Mar. 16, 2010.
Office action dated Sep. 12, 2012, U.S. Appl. No. 12/725,249, filed Mar. 16, 2010.
Office action dated Dec. 21, 2012, U.S. Appl. No. 13/098,490, filed May 2, 2011.
Office action dated Mar. 27, 2014, U.S. Appl. No. 13/098,490, filed May 2, 2011.
Office action dated Jul. 9, 2013, U.S. Appl. No. 13/098,490, filed May 2, 2011.
Office action dated May 22, 2013, U.S. Appl. No. 13/087,239, filed Apr. 14, 2011.

(56) References Cited

OTHER PUBLICATIONS

Office action dated Dec. 5, 2012, U.S. Appl. No. 13/087,239, filed Apr. 14, 2011.
Office action dated Apr. 9, 2014, U.S. Appl. No. 13/092,724, filed Apr. 22, 2011.
Office action dated Feb. 5, 2013, U.S. Appl. No. 13/092,724, filed Apr. 22, 2011.
Office action dated Jan. 10, 2014, U.S. Appl. No. 13/092,580, filed Apr. 22, 2011.
Office action dated Jun. 10, 2013, U.S. Appl. No. 13/092,580, filed Apr. 22, 2011.
Office action dated Jan. 16, 2014, U.S. Appl. No. 13/042,259, filed Mar. 7, 2011.
Office action dated Mar. 18, 2013, U.S. Appl. No. 13/042,259, filed Mar. 7, 2011.
Office action dated Jul. 31, 2013, U.S. Appl. No. 13/042,259, filed Mar. 7, 2011.
Office action dated Aug. 29, 2014, U.S. Appl. No. 13/042,259, filed Mar. 7, 2011.
Office action dated Mar. 14, 2014, U.S. Appl. No. 13/092,460, filed Apr. 22, 2011.
Office action dated Jun. 21, 2013, U.S. Appl. No. 13/092,460, filed Apr. 22, 2011.
Office action dated Aug. 14, 2014, U.S. Appl. No. 13/092,460, filed Apr. 22, 2011.
Office action dated Jan. 28, 2013, U.S. Appl. No. 13/092,701, filed Apr. 22, 2011.
Office Action dated Mar. 26, 2014, U.S. Appl. No. 13/092,701, filed Apr. 22, 2011.
Office action dated Jul. 3, 2013, U.S. Appl. No. 13/092,701, filed Apr. 22, 2011.
Office Action dated Apr. 9, 2014, U.S. Appl. No. 13/092,752, filed Apr. 22, 2011.
Office action dated Jul. 18, 2013, U.S. Appl. No. 13/092,752, filed Apr. 22, 2011.
Office action dated Dec. 20, 2012, U.S. Appl. No. 12/950,974, filed Nov. 19, 2010.
Office action dated May 24, 2012, U.S. Appl. No. 12/950,974, filed Nov. 19, 2010.
Office action dated Jan. 6, 2014, U.S. Appl. No. 13/092,877, filed Apr. 22, 2011.
Office action dated Sep. 5, 2013, U.S. Appl. No. 13/092,877, filed Apr. 22, 2011.
Office action dated Mar. 4, 2013, U.S. Appl. No. 13/092,877, filed Apr. 22, 2011.
Office action dated Jan. 4, 2013, U.S. Appl. No. 12/950,968, filed Nov. 19, 2010.
Office action dated Jun. 7, 2012, U.S. Appl. No. 12/950,968, filed Nov. 19, 2010.
Office action dated Sep. 19, 2012, U.S. Appl. No. 13/092,864, filed Apr. 22, 2011.
Office action dated May 31, 2013, U.S. Appl. No. 13/098,360, filed Apr. 29, 2011.
Office action dated Jul. 7, 2014, for U.S. Appl. No. 13/044,326, filed Mar. 9, 2011.
Office action dated Oct. 2, 2013, U.S. Appl. No. 13/044,326, filed Mar. 9, 2011.
Office Action dated Dec. 19, 2014, for U.S. Appl. No. 13/044,326, filed Mar. 9, 2011.
Office action dated Dec. 3, 2012, U.S. Appl. No. 13/030,806, filed Feb. 18, 2011.
Office action dated Apr. 22, 2014, U.S. Appl. No. 13/030,806, filed Feb. 18, 2011.
Office action dated Jun. 11, 2013, U.S. Appl. No. 13/030,806, filed Feb. 18, 2011.
Office action dated Apr. 25, 2013, U.S. Appl. No. 13/030,688, filed Feb. 18, 2011.
Office action dated Feb. 22, 2013, U.S. Appl. No. 13/044,301, filed Mar. 9, 2011.
Office action dated Jun. 11, 2013, U.S. Appl. No. 13/044,301, filed Mar. 9, 2011.
Office action dated Oct. 26, 2012, U.S. Appl. No. 13/050,102, filed Mar. 17, 2011.
Office action dated May 16, 2013, U.S. Appl. No. 13/050,102, filed Mar. 17, 2011.
Office action dated Aug. 4, 2014, U.S. Appl. No. 13/050,102, filed Mar. 17, 2011.
Office action dated Jan. 28, 2013, U.S. Appl. No. 13/148,526, filed Jul. 16, 2011.
Office action dated Dec. 2, 2013, U.S. Appl. No. 13/184,526, filed Jul. 16, 2011.
Office action dated May 22, 2013, U.S. Appl. No. 13/148,526, filed Jul. 16, 2011.
Office action dated Aug. 21, 2014, U.S. Appl. No. 13/184,526, filed Jul. 16, 2011.
Office action dated Nov. 29, 2013, U.S. Appl. No. 13/092,873, filed Apr. 22, 2011.
Office action dated Jun. 19, 2013, U.S. Appl. No. 13/092,873, filed Apr. 22, 2011.
Office action dated Jul. 18, 2013, U.S. Appl. No. 13/365,808, filed Feb. 3, 2012.
Office Action dated Mar. 6, 2014, U.S. Appl. No. 13/425,238, filed Mar. 20, 2012.
Office action dated Nov. 12, 2013, U.S. Appl. No. 13/312,903, filed Dec. 6, 2011.
Office action dated Jun. 13, 2013, U.S. Appl. No. 13/312,903, filed Dec. 6, 2011.
Office Action dated Jun. 18, 2014, U.S. Appl. No. 13/440,861, filed Apr. 5, 2012.
Office Action dated Feb. 28, 2014, U.S. Appl. No. 13/351,513, filed Jan. 17, 2012.
Office Action dated May 9, 2014, U.S. Appl. No. 13/484,072, filed May 30, 2012.
Office Action dated May 14, 2014, U.S. Appl. No. 13/533,843, filed Jun. 26, 2012.
Office Action dated Feb. 20, 2014, U.S. Appl. No. 13/598,204, filed Aug. 29, 2012.
Office Action dated Jun. 6, 2014, U.S. Appl. No. 13/669,357, filed Nov. 5, 2012.
Brocade 'An Introduction to Brocade VCS Fabric Technology', Dec. 3, 2012.
Huang, Nen-Fu et al., 'An Effective Spanning Tree Algorithm for a Bridged LAN', Mar. 16, 1992.
Lapuh, Roger et al., 'Split Multi-link Trunking (SMLT) draft-lapuh-network-smlt-08', Jan. 2009.
Mckeown, Nick et al. "OpenFlow: Enabling Innovation in Campus Networks", Mar. 14, 2008, www.openflow.org/documents/openflow-wp-latest.pdf.
Office Action for U.S. Appl. No. 13/030,688, filed Feb. 18, 2011, dated Jul. 17, 2014.
Office Action for U.S. Appl. No. 13/042,259, filed Mar. 7, 2011, from Jaroenchonwanit, Bunjob, dated Jan. 16, 2014.
Office Action for U.S. Appl. No. 13/044,326, filed Mar. 9, 2011, dated Jul. 7, 2014.
Office Action for U.S. Appl. No. 13/092,752, filed Apr. 22, 2011, dated Apr. 9, 2014.
Office Action for U.S. Appl. No. 13/092,873, filed Apr. 22, 2011, dated Jul. 25, 2014.
Office Action for U.S. Appl. No. 13/092,877, filed Apr. 22, 2011, dated Jun. 20, 2014.
Office Action for U.S. Appl. No. 13/312,903, filed Dec. 6, 2011, dated Aug. 7, 2014.
Office Action for U.S. Appl. No. 13/425,238, filed Mar. 20, 2012, dated Mar. 6, 2014.
Office Action for U.S. Appl. No. 13/556,061, filed Jul. 23, 2012, dated Jun. 6, 2014.
Office Action for U.S. Appl. No. 13/950,974, filed Nov. 19, 2010, from Haile, Awet A., dated Dec. 2, 2012.
Office Action for U.S. Appl. No. 12/725,249, filed Mar. 16, 2010, dated Sep. 12, 2012.
Office Action for U.S. Appl. No. 13/098,490, filed May 2, 2011, dated Dec. 21, 2012.

(56) References Cited

OTHER PUBLICATIONS

Office Action for U.S. Appl. No. 13/098,490, filed May 2, 2011, dated Mar. 27, 2014.
Office Action for U.S. Appl. No. 13/312,903, filed Dec. 6, 2011, dated Jun. 13, 2013.
Office Action for U.S. Appl. No. 13/044,301, dated Mar. 9, 2011.
Office Action for U.S. Appl. No. 13/087,239, Filing date Apr. 14, 2011, dated Dec. 5, 2012.
Office Action for U.S. Appl. No. 13/092,873, filed Apr. 22, 2011, dated Nov. 7, 2014.
Office Action for U.S. Appl. No. 13/092,877, filed Apr. 22, 2011, dated Nov. 10, 2014.
Office Action for U.S. Appl. No. 13/157,942, filed Jun. 10, 2011.
Office Action for U.S. Appl. No. 13/184,526, filed Jul. 16, 2011, dated Jan. 5, 2015.
Office Action for U.S. Appl. No. 13/184,526, filed Jul. 16, 2011, dated Dec. 2, 2013.
Office Action for U.S. Appl. No. 13/351,513, filed Jan. 17, 2012, dated Feb. 28, 2014.
Office Action for U.S. Appl. No. 13/533,843, filed Jun. 26, 2012, dated Oct. 21, 2013.
Office Action for U.S. Appl. No. 13/598,204, filed Aug. 29, 2012, dated Jan. 5, 2015.
Office Action for U.S. Appl. No. 13/598,204, filed Aug. 29, 2012, dated Feb. 20, 2014.
Office Action for U.S. Appl. No. 13/669,357, filed Nov. 5, 2012, dated Jan. 30, 2015.
Office Action for U.S. Appl. No. 13/851,026, filed Mar. 26, 2013, dated Jan. 30, 2015.
Office Action for U.S. Appl. No. 13/092,887, dated Jan. 6, 2014.
Zhai F. Hu et al. 'RBridge: Pseudo-Nickname; draft-hu-trill-pseudonode-nickname-02.txt', May 15, 2012.
Abawajy J. "An Approach to Support a Single Service Provider Address Image for Wide Area Networks Environment" Centre for Parallel and Distributed Computing, School of Computer Science Carleton University, Ottawa, Ontario, K1S 5B6, Canada.
Office action dated Oct. 2, 2014, for U.S. Appl. No. 13/092,752, filed Apr. 22, 2011.
Kompella, Ed K. et al., 'Virtual Private LAN Service (VPLS) Using BGP for Auto-Discovery and Signaling' Jan. 2007.
Office Action for U.S. Appl. No. 13/042,259, filed Mar. 7, 2011, dated Feb. 23, 2015.
Office Action for U.S. Appl. No. 13/044,301, filed Mar. 9, 2011, dated Jan. 29, 2015.
Office Action for U.S. Appl. No. 13/050,102, filed Mar. 17, 2011, dated Jan. 26, 2015.
Office Action for U.S. Appl. No. 13/092,460, filed Apr. 22, 2011, dated Mar. 13, 2015.
Office Action for U.S. Appl. No. 13/092,752, filed Apr. 22, 2011, dated Feb. 27, 2015.
Office Action for U.S. Appl. No. 13/425,238, filed Mar. 20, 2012, dated Mar. 12, 2015.
Office Action for U.S. Appl. No. 13/425,238, dated Mar. 12, 2015.
Office Action for U.S. Appl. No. 13/786,328, filed Mar. 5, 2013, dated Mar. 13, 2015.
Office Action for U.S. Appl. No. 14/577,785, filed Dec. 19, 2014, dated Apr. 13, 2015.
Rosen, E. et al., "BGP/MPLS VPNs", Mar. 1999.
Office action dated Jun. 8, 2015, U.S. Appl. No. 14/178,042, filed Feb. 11, 2014.
Office Action dated May 21, 2015, U.S. Appl. No. 13/288,822, filed Nov. 3, 2011.
Office action dated Apr. 30, 2015, U.S. Appl. No. 13/351,513, filed Jan. 17, 2012.
Office Action dated Apr. 1, 2015, U.S. Appl. No. 13/656,438, filed Oct. 19, 2012.
Office Action dated Jun. 10, 2015, U.S. Appl. No. 13/890,150, filed May 8, 2013.
Mahalingam "VXLAN: A Framework for Overlaying Virtualized Layer 2 Networks over Layer 3 Networks" Oct. 17, 2013 pp. 1-22, Sections 1, 4 and 4.1.
Siamak Azodolmolky et al. "Cloud computing networking: Challenges and opportunities for innovations", IEEE Communications Magazine, vol. 51, No. 7, Jul. 1, 2013.
Office Action dated Jul. 31, 2015, U.S. Appl. No. 13/598,204, filed Aug. 29, 2014.
Office Action dated Jul. 31, 2015, U.S. Appl. No. 14/473,941, filed Aug. 29, 2014.
Office Action dated Jul. 31, 2015, U.S. Appl. No. 14/488,173, filed Sep. 16, 2014.
Office Action dated Aug. 21, 2015, U.S. Appl. No. 13/776,217, filed Feb. 25, 2013.
Office Action dated Aug. 19, 2015, U.S. Appl. No. 14/156,374, filed Jan. 15, 2014.
Office Action dated Sep. 2, 2015, U.S. Appl. No. 14/151,693, filed Jan. 9, 2014.
Office Action dated Sep. 17, 2015, U.S. Appl. No. 14/577,785, filed Dec. 19, 2014.
Office Action dated Sep. 22, 2015 U.S. Appl. No. 13/656,438, filed Oct. 19, 2012,
Office Action dated Nov. 5, 2015, U.S. Appl. No. 14/178,042, filed Feb. 11, 2014.
Office Action dated Oct. 19, 2015, U.S. Appl. No. 14/215,996, filed Mar. 17, 2014.
Office Action dated Sep. 18, 2015, U.S. Appl. No. 13/345,566, filed Jan. 6, 2012.
Open Flow Switch Specification Version 1.2 Dec. 5, 2011.
Open Flow Switch Specification Version 1.1.0, Feb. 28, 2011.
Open Flow Switch Specification Version 1.0.0, Dec. 31, 2009.
Open Flow Configuration and Management Protocol 1.0 (OF-Config 1.0) Dec. 23, 2011.
Office Action for U.S. Appl. No. 14/662,095, dated Mar. 24, 2017.
Office Action for U.S. Appl. No. 15/005,967, dated Mar. 31, 2017.
Office Action for U.S. Appl. No. 15/215,377, dated Apr. 7, 2017.
Office Action for U.S. Appl. No. 13/098,490, dated Apr. 6, 2017.
Office Action for U.S. Appl. No. 14/662,092, dated Mar. 29, 2017.
Office Action for U.S. Appl. No. 13/288,822, dated May 26, 2017.
Office Action for U.S. Appl. No. 14/329,447, dated Jun. 8, 2017.
Office action dated Feb. 2, 2016, U.S. Appl. No. 13/092,460, filed Apr. 22, 2011.
Office Action dated Feb. 2, 2016. U.S. Appl. No. 14/154,106, filed Jan. 13, 2014.
Office Action dated Feb. 3, 2016, U.S. Appl. No. 13/098,490, filed May 2, 2011.
Office Action dated Feb. 4, 2016, U.S. Appl. No. 13/557,105, filed Jul. 24, 2012.
Office Action dated Feb. 11, 2016, U.S. Appl. No. 14/488,173, filed Sep. 16, 2014.
Office Action dated Feb. 24, 2016, U.S. Appl. No. 13/971,397, filed Aug. 20, 2013.
Office Action dated Feb. 24, 2016, U.S. Appl. No. 12/705,508, filed Feb. 12, 2010.
Office Action dated Jul. 6, 2016, U.S. Appl. No. 14/618,941, filed Feb. 10, 2015.
Office Action dated Jul. 20, 2016, U.S. Appl. No. 14/510,913, filed Oct. 9, 2014.
Office Action dated Jul. 29, 2016, U.S. Appl. No. 14/473,941, filed Aug. 29, 2014.
Office Action dated Jul. 28, 2016, U.S. Appl. No. 14/284,212, filed May 21, 2016.
Office Action dated Jan. 31, 2017, U.S. Appl. No. 13/184,526, filed Jul. 16, 2011.
Office Action dated Jan. 27, 2017, U.S. Appl. No. 14/216,292, filed Mar. 17, 2014.
Office Action dated Jan. 26, 2017, U.S. Appl. No. 13/786,328, filed Mar. 5, 2013.
Office Action dated Dec. 2, 2016, U.S. Appl. No. 14/512,268, filed Oct. 10, 2014.
Office Action dated Dec. 1, 2016, U.S. Appl. No. 13/899,849, filed May 22, 2013.

(56) References Cited

OTHER PUBLICATIONS

Office Action dated Dec. 1, 2016, U.S. Appl. No. 13/656,438, filed Oct. 19, 2012.
Office Action dated Nov. 30, 2016, U.S. Appl. No. 13/598,204, filed Aug. 29, 2012.
Office Action dated Nov. 21, 2016, U.S. Appl. No. 13/669,357, filed Nov. 5, 2012.
Office Action dated Feb. 8, 2017, U.S. Appl. No. 14/473,941, filed Aug. 29, 2014.
Office Action dated Feb. 8, 2017, U.S. Appl. No. 14/822,380, filed Aug. 10, 2015.
"Network based IP VPN Architecture using Virtual Routers" Paul Knight et al.
Yang Yu et al "A Framework of using OpenFlow to handle transient link failure", TMEE, 2011 International Conference on, IEEE, Dec. 16, 2011.
Office Action for U.S. Appl. No. 15/227,789, dated Feb. 27, 2017.
Office Action for U.S. Appl. No. 14/822,380, dated Feb. 8, 2017.
Office Action for U.S. Appl. No. 14/704,660, dated Feb. 27, 2017.
Office Action for U.S. Appl. No. 14/510,913, dated Mar. 3, 2017.
Office Action for U.S. Appl. No. 14/473,941, dated Feb. 8, 2017.
Office Action for U.S. Appl. No. 14/329,447, dated Feb. 10, 2017.
Office Action for U.S. Appl. No. 14/817,097, dated May 4, 2017.
Office Action for U.S. Appl. No. 14/872,966, dated Apr. 20, 2017.
Office Action for U.S. Appl. No. 14/680,915, dated May 3, 2017.
Office Action for U.S. Appl. No. 14/792,166, dated Apr. 26, 2017.
Office Action for U.S. Appl. No. 14/660,803, dated May 17, 2017.
Office Action for U.S. Appl. No. 14/488,173, dated May 12, 2017.
Office Action for U.S. Appl. No. 14/510,913, dated Jun. 30, 2017.
Office Action for U.S. Appl. No. 15/005,946, dated Jul. 14, 2017.
Office Action for U.S. Appl. No. 13/092,873, dated Jul. 19, 2017.
Office Action for U.S. Appl. No. 15/047,539, dated Aug. 7, 2017.
Office Action for U.S. Appl. No. 14/830,035, dated Aug. 28, 2017.
Office Action for U.S. Appl. No. 13/098,490, dated Aug. 24, 2017.
Office Action for U.S. Appl. No. 13/786,328, dated Aug. 21, 2017.
Office Action dated Jun. 13, 2018, U.S. Appl. No. 13/786,328, filed Mar. 5, 2013.
IEEE et al., "Amendment to Carrier Sense Multiple Access with Collision Detection (CSMA/CD) Access Method and Physical Layer Specifications—Aggregation of Multiple Link Segments", Mar. 30, 2000, IEEE Computer Society, IEEE Std 802.3ad-2000, pp. 116-117.
Office Action dated Jul. 13, 2018, U.S. Appl. No. 15/402,924, filed Jul. 13, 2018.
Office Action dated Jul. 24, 2018, U.S. Appl. No. 14/799,371, filed Jul. 24, 2018.
Office Action for U.S. Appl. No. 14/216,292, dated Oct. 6, 2017.
Office Action dated Oct. 25, 2017, U.S. Appl. No. 14/867,865, filed Sep. 28, 2015.
Office action dated Oct. 26, 2017, U.S. Appl. No. 14/817,097, filed Aug. 3, 2015.
Office Action dated Mar. 20, 2018, U.S. Appl. No. 14/867,865, filed Sep. 28, 2015.

\* cited by examiner

ADVANCED MC OPTIONS SUPPORT NOTIFICATION MESSAGE 302

| VER. 312 | TYPE 314 | RESERVED 316 | CHECKSUM 318 |
|---|---|---|---|
| OPTION TYPE 320 (65001) | | OPTION LENGTH 322 (24 or 48) | |
| OPTION VALUE 324 (DEVICE KEY) | | | |

FIG. 3A

GR SUPPORT NOTIFICATION MESSAGE 304

| VER. 312 | TYPE 314 | RESERVED 316 | CHECKSUM 318 |
|---|---|---|---|
| OPTION TYPE 330 (65002) | | OPTION LENGTH 332 (0) | |
| OPTION VALUE 334 (Φ) | | | |

FIG. 3B

GR COMPLETION NOTIFICATION MESSAGE 306

| VER. 312 | TYPE 314 | RESERVED 316 | CHECKSUM 318 |
|---|---|---|---|
| OPTION TYPE 320 (65001) | | OPTION LENGTH 322 (46) | |
| OPTION VALUE 324 (DEVICE KEY) | | | |
| OPTION TYPE 330 (65002) | | OPTION LENGTH 332 (0) | |
| OPTION VALUE 334 (Φ) | | | |
| OPTION TYPE 340 (65003) | | OPTION LENGTH 342 (32 or 128) | |
| OPTION VALUE 344 (TARGET ID) | | | |

FIG. 3C

GRACEFUL RECOVERY OF A MULTICAST-ENABLED SWITCH

RELATED APPLICATION

This application claims the benefit of U.S. Provisional Application No. 62/199,931, titled "PIM Failover Fast Recovery," by inventor Indranil Bhattacharya, filed 31 Jul. 2015, the disclosure of which is incorporated by reference herein.

BACKGROUND

Field

The present disclosure relates to network management. More specifically, the present disclosure relates to a method and system for efficient failover in a multicast distribution tree.

Related Art

The exponential growth of the Internet has made it a popular delivery medium for multimedia applications, such as video on demand and television. Such applications have brought with them an increasing demand for bandwidth. As a result, equipment vendors race to build larger and faster switches with versatile capabilities, such as multicasting, to move more traffic efficiently. However, the size of a switch cannot grow infinitely. It is limited by physical space, power consumption, and design complexity, to name a few factors. Furthermore, switches with higher capability are usually more complex and expensive. More importantly, because an overly large and complex system often does not provide economy of scale, simply increasing the size and capability of a switch may prove economically unviable due to the increased per-port cost.

One way to meet this challenge is to interconnect a number of switches in a multicast tree to support a large number of multicast users of a multicast group. When such a switch goes through a recovery (e.g., from a failure), the switch reconciles the local multicast states. Usually, for reconciliation, the switch relies on the neighbor switches of the multicast tree to send the multicast states (e.g., the join messages for the multicast group). However, this reconciliation procedure is not deterministic because the switch is unaware of whether a neighbor switch has completed sending its states. Hence, the switch usually waits for a finite period of time to completely rebuild its local multicast states, leading to delay and reduced performance.

While multicast brings many desirable features to a network, some issues remain unsolved in efficient recovery in a multicast network.

SUMMARY

One embodiment of the present invention provides a switch. The switch includes a processor, a storage device, a multicast management module, and a graceful recovery module. The multicast management module participates in a multicast tree of a multicast group. The graceful recovery module determines a recovery event and constructs a message indicating the recovery event for a second switch. The switch and the second switch belong to a first virtual local area network (VLAN). The graceful recovery module then identifies a completion notification message from the second switch indicating a completion of replaying multicast information stored in the second switch and includes multicast information received from the second switch in a local multicast database.

In a variation on this embodiment, the graceful recovery module identifies a completion notification message from a respective neighbor switch in the first VLAN. The switch also comprises a forwarding module, which synchronizes forwarding information in the local multicast database with the forwarding hardware of the switch.

In a variation on this embodiment, if the graceful recovery module has identified the completion notification message from the second switch, the graceful recovery module terminates a timer for the second switch. The timer represents a period of time the switch waits for multicast information from the second switch.

In a variation on this embodiment, the graceful recovery module constructs a second message indicating the recovery event for a third switch. The switch and the third switch belong to a second VLAN distinct from a first VLAN.

In a variation on this embodiment, the graceful recovery module constructs a multicast notification message for the second switch. This multicast notification message indicates that the switch supports advanced multicast options.

In a variation on this embodiment, the graceful recovery module constructs a graceful recovery notification message for the second switch. The graceful recovery notification message indicates that the switch supports construction and identification of a completion notification message.

In a variation on this embodiment, the completion notification message is a Protocol-Independent Multicast (PIM) hello message, which includes an option type value indicating that the hello message is the completion notification message.

In a variation on this embodiment, the completion notification message includes a switch identifier of the switch as a target identifier distinct from a destination address of the completion notification message.

In a variation on this embodiment, the switch is a standby switch for a remote switch, and the recovery event is an unavailability of the remote switch.

In a further variation, the switch includes a high availability module, which obtains neighbor state information from one or more synchronization messages from the remote switch. The neighbor state information indicates whether a neighbor switch supports construction and identification of a completion notification message.

BRIEF DESCRIPTION OF THE FIGURES

FIG. 3A illustrates an exemplary message indicating advanced multicast options support for a switch, in accordance with an embodiment of the present invention.

FIG. 3B illustrates an exemplary message indicating graceful recovery support for a switch, in accordance with an embodiment of the present invention.

FIG. 3C illustrates an exemplary message indicating completion of a graceful recovery, in accordance with an embodiment of the present invention.

In the figures, like reference numerals refer to the same figure elements.

DETAILED DESCRIPTION

Figure 1A:
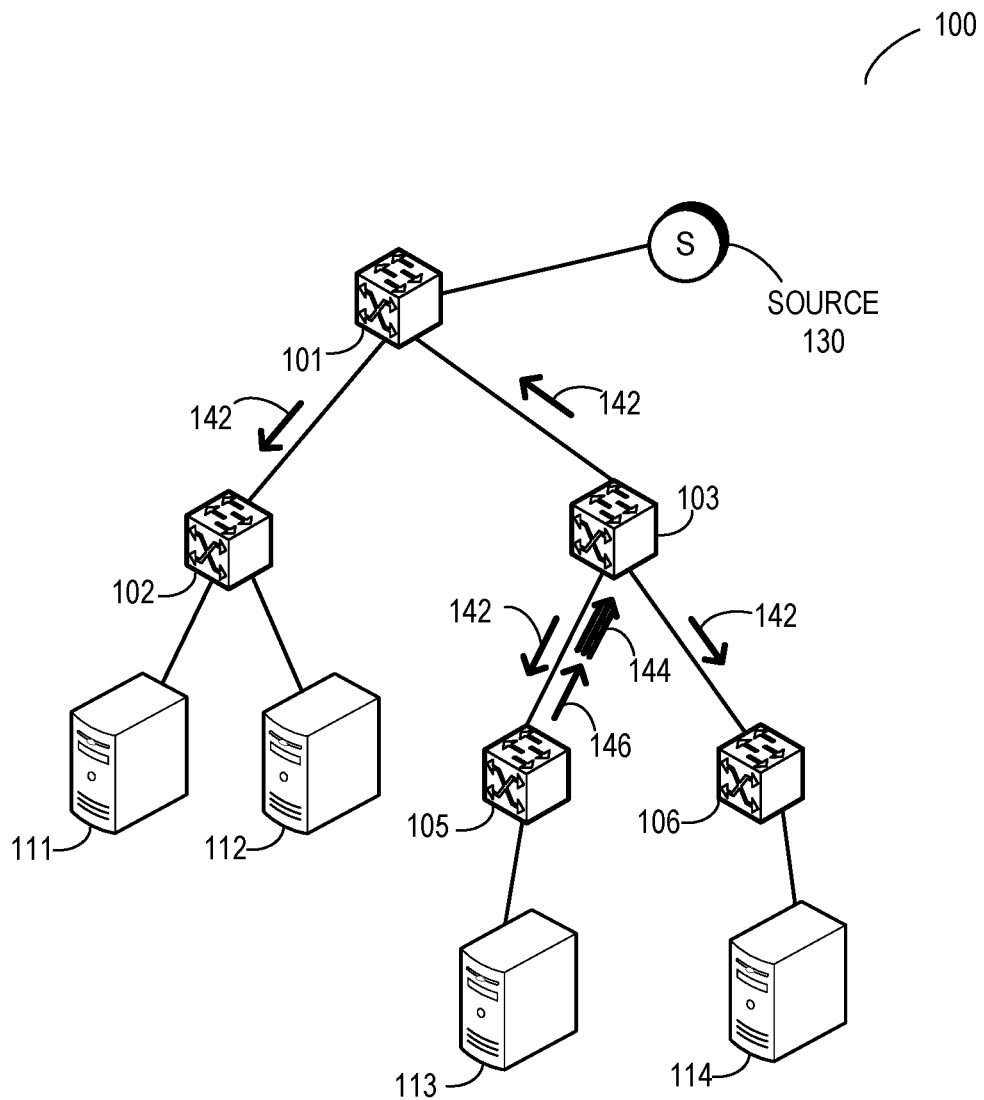
FIG. 1A illustrates an exemplary graceful recovery of a switch in a multicast distribution tree, in accordance with an embodiment of the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

Overview

In embodiments of the present invention, the problem of efficiently recovering a switch participating in a multicast distribution tree is solved by neighbor switches of the switch notifying the switch regarding completion of reconciliation. The recovering switch can participate in the multicast tree using Protocol Independent Multicast (PIM) and can be referred to as a multicast-enabled switch. Neighbor switches of the switch include the multicast-enabled switches that are in a same local area network (LAN) or virtual LAN (VLAN).

With existing technologies, when the switch becomes unavailable (e.g., due to a failure, reboot, or update), after recovery, the switch reconciles with the multicast states of the neighbor switches. The multicast states comprise PIM Multicast Cache (MCACHE) states, which includes route information associated with the source and multicast group (i.e., the multicast routing states). To reconcile multicast states, neighbor switches replay their MCACHE and send join/prune messages associated with the multicast routing states in their respective MCACHE to the recovering switch. For example, the recovering switch receives join/prune messages for which the recovering switch is an upstream switch. In this way, the recovering switch receives information associated with any new or updated multicast state associated with an MCACHE entry of a neighbor switch.

However, this process is not deterministic since the switch cannot determine whether a neighbor switch has completed replaying its MCACHE. Hence, the switch waits for a period of time to determine that a neighbor switch has completed replaying its MCACHE. Upon determining this for a respective neighbor switch, the switch completes rebuilding its local MCACHE and synchronizes the entries with underlying forwarding hardware. This leads to delay in the reconciliation process.

To solve this problem, the multicast-enabled switches in a network implement a graceful recovery process. During operation, these switches notify each other (e.g., by constructing and sending a notification message) by indicating that they support advanced multicast options and graceful recovery. In this way, the switches discover each other's support of graceful discovery. It should be noted that the advanced multicast options allow implementation of multicast features in addition to the graceful recovery. In response to a recovery event for a switch (e.g., when a switch recovers from unavailability), neighbor switches are aware of its graceful recovery support. Hence, when a neighbor switch completes replaying its MCACHE for the recovering switch, the neighbor switch sends an explicit notification message to the recovering switch indicating the completion. In this way, the recovering switch determines the completion of the reconciliation with a respective neighbor, and facilitates efficient and graceful recovery for the switch.

In some embodiments, a multicast-enabled switch is a member switch in a fabric switch. In a fabric switch, any number of switches coupled in an arbitrary topology may logically operate as a single switch. The fabric switch can be an Ethernet fabric switch or a virtual cluster switch (VCS), which can operate as a single Ethernet switch. Any member switch may join or leave the fabric switch in "plug-and-play" mode without any manual configuration. In some embodiments, a respective switch in the fabric switch is a Transparent Interconnection of Lots of Links (TRILL) routing bridge (RBridge). In some further embodiments, a respective switch in the fabric switch is an Internet Protocol (IP) routing-capable switch (e.g., an IP router).

It should be noted that a fabric switch is not the same as conventional switch stacking. In switch stacking, multiple switches are interconnected at a common location (often within the same rack), based on a particular topology, and manually configured in a particular way. These stacked switches typically share a common address, e.g., an IP address, so they can be addressed as a single switch externally. Furthermore, switch stacking requires a significant amount of manual configuration of the ports and inter-switch links. The need for manual configuration prohibits switch stacking from being a viable option in building a large-scale switching system. The topology restriction imposed by switch stacking also limits the number of switches that can be stacked. This is because it is very difficult, if not impossible, to design a stack topology that allows the overall switch bandwidth to scale adequately with the number of switch units.

In contrast, a fabric switch can include an arbitrary number of switches with individual addresses, can be based on an arbitrary topology, and does not require extensive manual configuration. The switches can reside in the same location, or be distributed over different locations. These features overcome the inherent limitations of switch stacking and make it possible to build a large "switch farm," which can be treated as a single, logical switch. Due to the automatic configuration capabilities of the fabric switch, an individual physical switch can dynamically join or leave the fabric switch without disrupting services to the rest of the network.

Furthermore, the automatic and dynamic configurability of the fabric switch allows a network operator to build its switching system in a distributed and "pay-as-you-grow" fashion without sacrificing scalability. The fabric switch's ability to respond to changing network conditions makes it an ideal solution in a virtual computing environment, where network loads often change with time.

It should also be noted that a fabric switch is distinct from a VLAN. A fabric switch can accommodate a plurality of VLANs. A VLAN is typically identified by a VLAN tag. In contrast, the fabric switch is identified by a fabric identifier (e.g., a VCS identifier), which is assigned to the fabric switch. A respective member switch of the fabric switch is associated with the fabric identifier. Furthermore, when a member switch of a fabric switch learns a media access control (MAC) address of an end device (e.g., via layer-2 MAC address learning), the member switch generates a notification message, includes the learned MAC address in the payload of the notification message, and sends the notification message to all other member switches of the fabric switch. In this way, a learned MAC address is shared with a respective member switch of the fabric switch.

In this disclosure, the term "fabric switch" refers to a number of interconnected physical switches which form a single, scalable logical switch. These physical switches are referred to as member switches of the fabric switch. In a fabric switch, any number of switches can be connected in an arbitrary topology, and the entire group of switches functions together as one single, logical switch. This feature makes it possible to use many smaller, inexpensive switches to construct a large fabric switch, which can be viewed as a single logical switch externally. Although the present disclosure is presented using examples based on a fabric switch, embodiments of the present invention are not limited to a fabric switch. Embodiments of the present invention are relevant to any computing device that includes a plurality of devices operating as a single device.

Although the present disclosure is presented using examples based on an encapsulation protocol, embodiments of the present invention are not limited to networks defined using one particular encapsulation protocol associated with a particular Open System Interconnection Reference Model (OSI Reference Model) layer. For example, embodiments of the present invention can also be applied to a multi-protocol label switching (MPLS) network. In this disclosure, the term "encapsulation" is used in a generic sense, and can refer to encapsulation in any networking layer, sub-layer, or a combination of networking layers.

The term "end device" can refer to any device external to a network (e.g., which does not perform forwarding in that network). Examples of an end device include, but are not limited to, a physical or virtual machine, a conventional layer-2 switch, a layer-3 router, or any other type of network device. Additionally, an end device can be coupled to other switches or hosts further away from a layer-2 or layer-3 network. An end device can also be an aggregation point for a number of network devices to enter the network. An end device hosting one or more virtual machines can be referred to as a host machine. In this disclosure, the terms "end device" and "host machine" are used interchangeably.

The term "message" refers to a group of bits that can be transported together across a network. "Message" should not be interpreted as limiting embodiments of the present invention to a particular network layer. "Message" can be replaced by other terminologies referring to a group of bits, such as "packet," "frame," "cell," or "datagram."

The term "switch" is used in a generic sense, and can refer to any standalone or fabric switch operating in any network layer. "Switch" can be a physical device or software running on a computing device. "Switch" should not be interpreted as limiting embodiments of the present invention to layer-2 networks. Any device that can forward traffic to an external device or another switch can be referred to as a "switch." Examples of a "switch" include, but are not limited to, a layer-2 switch, a layer-3 router, a TRILL RBridge, or a fabric switch comprising a plurality of similar or heterogeneous smaller physical switches.

The term "RBridge" refers to routing bridges, which are bridges implementing the TRILL protocol as described in Internet Engineering Task Force (IETF) Request for Comments (RFC) "Routing Bridges (RBridges): Base Protocol Specification," available at http://tools.ietf.org/html/rfc6325, which is incorporated by reference herein. Embodiments of the present invention are not limited to application among RBridges. Other types of switches, routers, and forwarders can also be used.

The term "edge port" refers to a port on a network which exchanges data frames with a device outside of the network (i.e., an edge port is not used for exchanging data frames with another member switch of a network). The term "inter-switch port" refers to a port which sends/receives data frames among member switches of the network. The terms "interface" and "port" are used interchangeably.

The term "switch identifier" refers to a group of bits that can be used to identify a switch. Examples of a switch identifier include, but are not limited to, a media access control (MAC) address, an Internet Protocol (IP) address, and an RBridge identifier. Note that the TRILL standard uses "RBridge ID" (RBridge identifier) to denote a 48-bit intermediate-system-to-intermediate-system (IS-IS) System ID assigned to an RBridge, and "RBridge nickname" to denote a 16-bit value that serves as an abbreviation for the "RBridge ID." In this disclosure, "switch identifier" is used as a generic term, is not limited to any bit format, and can refer to any format that can identify a switch. The term "RBridge identifier" is also used in a generic sense, is not limited to any bit format, and can refer to "RBridge ID," "RBridge nickname," or any other format that can identify an RBridge.

The term "multicast tree" is used in a generic sense, and can refer to any topology associated with any "multicast protocol." A "multicast protocol" can refer to any protocol that can be used by devices in a network to distribute multicast data and/or control information. Examples of multicast protocol include, but are not limited to, Internet Group Management Protocol (IGMP), Multicast Listener Discovery (MLD) protocol, and Protocol-Independent Multicast (PIM). The term "multicast distribution tree" is also used in a generic sense, and can refer to any tree topology that can be used to distribute multicast data and/or control information in a network.

Network Architecture

FIG. 1A illustrates an exemplary graceful recovery of a switch in a multicast distribution tree, in accordance with an embodiment of the present invention. As illustrated in FIG. 1A, a multicast tree 100 includes multicast-enabled switches 101, 102, 103, 105, and 106. These switches can be in a physical local area network (LAN) or a virtual LAN (VLAN). In some embodiments, one or more switches in multicast tree 100 can be in a fabric switch and can appear as a single logical switch to all other neighbor switches. End devices 111 and 112 are coupled to switch 102, and end devices 113 and 114 are coupled to switches 105 and 106, respectively. These end devices have joined the multicast group of multicast tree 100 and receive multicast data via multicast tree 100. A source 130, which can be an end device, for the multicast group is coupled to switch 101.

During operation, switch 105 receives a join request from end device 113 for the multicast group. Switch 105 creates an entry comprising information associated with the multicast group in its local MCACHE (which can also be referred to as a multicast database). Information in the entry includes, but is not limited to, one or more of: multicast family, multicast group address (e.g., an IP address), a source address for the multicast group, an upstream interface, one or more downstream interfaces, rejected downstream interfaces, multicast session information, statistics, next-hop identifier, an upstream protocol (e.g., PIM), a current multicast state (e.g., indicating an active route), a forwarding state, a cache lifetime (e.g., a timeout value), and a number of incorrect incoming interface notifications.

Suppose that switch 103 becomes unavailable (e.g., due to a failure, reboot, or update). With existing technologies, switch 103 reconciles with the multicast states of its neighbor switches 101, 102, 105, and 106. To reconcile multicast states, switch 103 sends a "hello" message with a new generation identifier to the neighbor switches. The generation identifier is a value (e.g., a randomly generated value), which is regenerated each time a multicast forwarding is started or restarted from an interface (e.g., when a switch restarts). A switch maintains the current generation identifier for its respective neighbor switch. As a result, when the switch receives a "hello" message with a new generation identifier (i.e., a different value than the currently stored value), the switch determines that the sending switch has rebooted.

Hence, upon receiving the "hello" message from switch 103, the neighbor switches replay their MCACHE entries and send corresponding join/prune messages associated with the entries to switch 103. In this way, switch 103 receives information associated with any new or updated multicast state associated with an MCACHE entry of a neighbor switch. For example, downstream switch 105 might have created a new multicast state or chosen a new reverse path forwarding (RPF) route for an existing MCACHE entry. Switch 103 can receive this updated information based on the reconciliation process.

However, this process is not deterministic since switch 103 cannot determine whether a neighbor switch has completed replaying its MCACHE. For example, switch 103 cannot determine whether switch 105 has completed replaying its MCACHE. Hence, switch 103, upon sending the "hello" message to switch 105, initiates a timer for switch 105 to wait for a period of time. Switch 103 waits till the timer expires to determine that switch 105 has completed replaying its MCACHE. In the same way, switch 103 maintains a timer for switches 101, 102, and 106, and waits for each of these timers to expire.

Upon determining that switches 101, 102, 105, and 106 have completed replaying their respective MCACHE entries, switch 103 determines that it has received necessary information to rebuild its local MCACHE. Switch 103 then completes rebuilding its local MCACHE based on the received join/prune messages from neighbor switches. Switch 103 synchronizes the entries in the local MCACHE with underlying forwarding hardware (e.g., a content addressable memory (CAM)). Since switch 103 waits for the timer for a respective neighbor switch to expire before updating its forwarding hardware, the reconciliation process suffers delay and becomes inefficient.

To solve this problem, multicast-enabled switches 101, 102, 103, 105, and 106 implement a graceful recovery process. During operation, these switches construct a notification message indicating that they support advanced multicast options and send the notification message to each other. In this way, a respective switch determines that its neighbor switches support advanced multicast options, which allow implementation of multicast features, such as the graceful recovery. These switches construct another notification message indicating that they, among advanced multicast options, support graceful recovery. In this way, switches 101, 102, 103, 105, and 106 discover each other's support of graceful discovery.

When switch 103 detects a recovery event, switch 103 sends a "hello" message 142 with a new generation identifier to its neighbor switches 101, 102, 105, and 106 (i.e., the switches in the same VLAN). If switch 103 is a standalone switch, which does not have a standby switch, the recovery event can be a reboot (e.g., a recovery from an unavailability) or a live software update (e.g., an In-Service Software Upgrade (ISSU)). Upon receiving message 142, the neighbor switches determine that a recovery has been triggered for switch 103. The neighbor switches determine that, based on previously received notification messages, switch 103 supports graceful recovery. A neighbor switch, such as switch 105, starts replaying its MCACHE for switch 103, and sends one or more join/prune messages 144 (denoted with a multiline arrow) associated with the MCACHE entries (e.g., join/prune messages for multicast groups specified in the MCACHE of switch 105).

Since switches 103 and 105 support graceful recovery, upon completing sending join/prune messages 144 to switch 103, switch 105 sends a graceful recovery completion message 146 (which is also referred to graceful recovery completion notification message). When switch 103 receives message 146, switch 103 determines the completion of the reconciliation with switch 105 and terminates the timer for switch 105. In the same way, other neighbor switches replay their respective MCACHE for switch 103 and, upon completion, send a graceful recovery completion message. In some embodiments, only the downstream neighbor switches of switch 103 replay their respective MCACHEs. Because switch 103 has identified the neighbor switches with graceful recovery support, switch 103 waits for the graceful recovery completion message from a respective identified neighbor switch. When switch 103 receives the graceful recovery completion messages from all its neighbor switches, switch 103 determines that the reconciliation is complete. Switch 103 then completes constructing its local MCACHE based on received information and synchronizes its forwarding information with the forwarding hardware of switch 103.

Figure 1B:
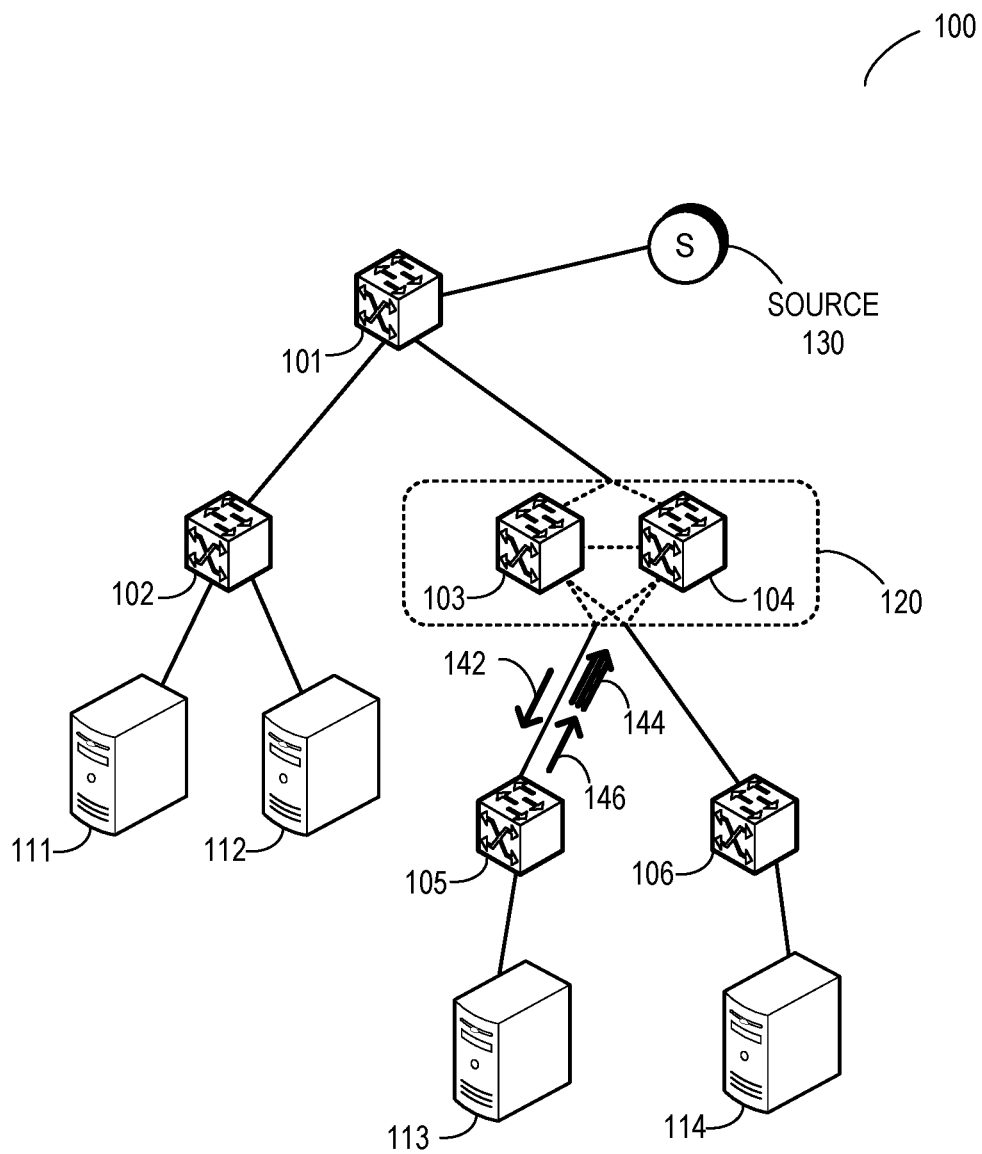
FIG. 1B illustrates an exemplary graceful recovery of a switch with high availability support in a multicast distribution tree, in accordance with an embodiment of the present invention.

FIG. 1B illustrates an exemplary graceful recovery of a switch with high availability support in a multicast distribution tree, in accordance with an embodiment of the present invention. In this example, switch 103 has a standby switch 104 and forms a switch system 120 with high availability support. In some embodiments, the high availability support is provided by a high availability protocol. Examples of a high availability protocol include, but are not limited to, Virtual Router Redundancy Protocol (VRRP), Virtual Switch Redundancy Protocol (VSRP), Common Address Redundancy Protocol (CARP), and Hot Standby Router Protocol (HSRP). In this example, other switches in tree 100 can also have high availability support (not shown).

In some embodiments, switches 103 and 104 are associated with a virtual switch and have a virtual switch identifier (e.g., a virtual IP address). The active switch receives and forwards packets with the virtual IP address. When the active switch goes through a failover, the virtual IP address becomes associated with the standby switch. In this example, switch 103 is the active switch and switch 104 is the standby switch. Switch 104 can remain inactive and becomes active if switch 103 becomes unavailable. To ensure a quick failover, switch 103 synchronizes its neighbor states with switch 104. For example, when switch 103 receives advanced multicast option and graceful recovery support notifications from neighbor switches, switch 103 synchronizes that information with switch 104. As a result, switch 104 is also aware of the neighbor switches with graceful recovery support.

When switch 104 detects a recovery event (e.g., a failure for switch 103), switch 104 sends a "hello" message 142 with a new generation identifier to its neighbor switches 101, 102, 105, and 106. Switch 104 can use its virtual IP address as the source address of message 142. As a result, switches 101, 102, 105, and 106 determine that the same switch (i.e., switch 103) is rebooting. Hence, upon receiving message 142, the neighbor switches determine that a recovery has been triggered for switch system 120. A neighbor switch, such as switch 105, starts replaying its MCACHE for switch 104, and sends one or more join/prune messages 144 (denoted with a multiline arrow) associated with the MCACHE entries. Upon completion of reconciliation, switch 105 sends a graceful recovery completion message 146.

When switch 104 receives message 146, switch 104 determines the completion of the reconciliation with switch 105 and terminates the timer for switch 105. In the same way, other neighbor switches replay their respective MCACHEs for switch 104 and, upon completion, send a graceful recovery completion message. Because switch 103 has synchronized its member states with switch 104, switch 104 waits for the graceful recovery completion message from a respective identified neighbor switch. When switch 104 receives the graceful recovery completion messages from all its neighbor switches, switch 104 determines that the reconciliation is complete. Switch 104 then completes constructing its local MCACHE based on received information and synchronizes its forwarding information with the forwarding hardware of switch 104.

Figure 1C:
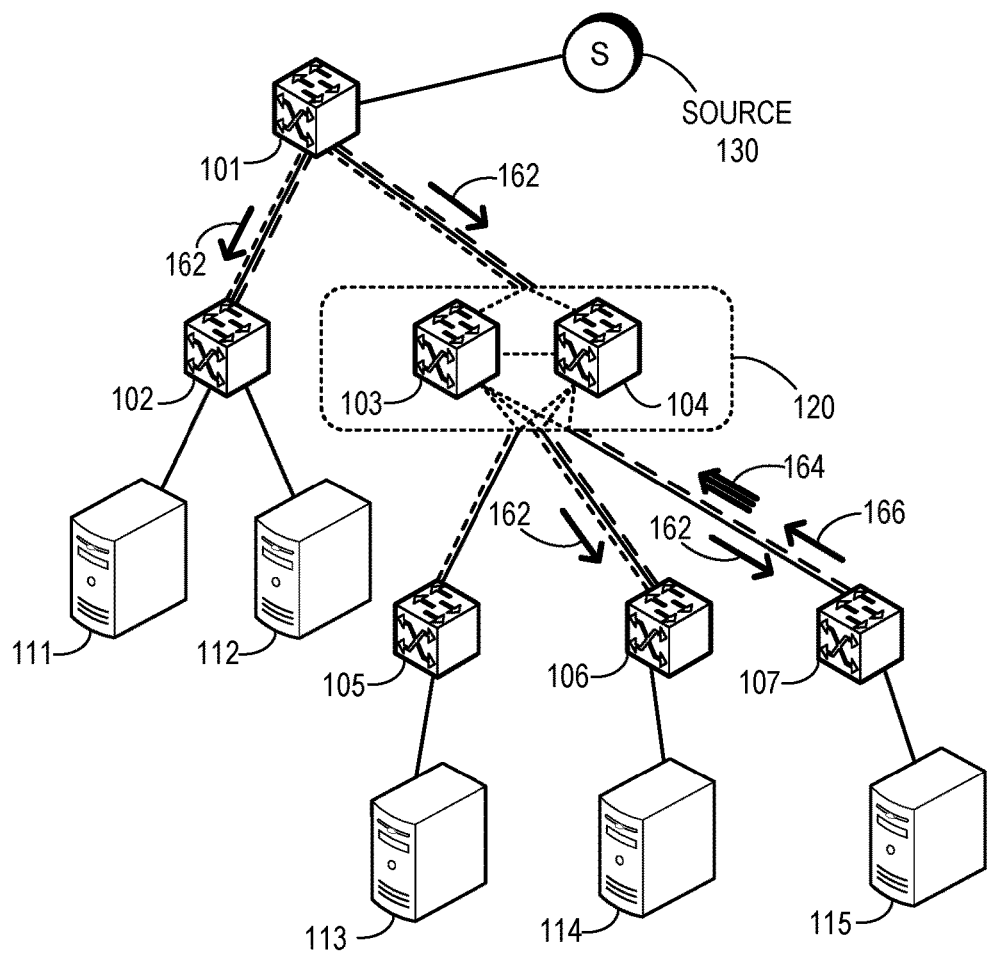
FIG. 1C illustrates an exemplary graceful recovery of a switch with high-availability support in a plurality of multicast distribution trees, in accordance with an embodiment of the present invention.

FIG. 1C illustrates an exemplary graceful recovery of a switch with high-availability support in a plurality of multicast distribution trees, in accordance with an embodiment of the present invention. In this example, switch system 120 with high availability participates in VLANs 152 and 154. Suppose that the members of multicast tree 100 of FIG. 1B are in VLAN 152. On the other hand, switches 101, 102, 103, 104, 106, and 107 are in VLAN 154. As a result, when switch 104 detects a recovery event, switch 104 sends a separate "hello" message 162 with a new generation identifier to its neighbor switches in VLAN 154. As a result, a switch in both VLANs 152 and 154 can receive multiple hello messages from switch 104.

Upon receiving message 162, the neighbor switches in VLAN 154 determine that a recovery has been triggered for switch system 120. A neighbor switch, such as switch 107, starts replaying its MCACHE for switch 104, and sends one or more join/prune messages 164 (denoted with a multiline arrow) associated with the MCACHE entries. Upon completion of reconciliation, switch 107 sends a graceful recovery completion message 166. When switch 104 receives the graceful recovery completion messages from all its neighbor switches in VLAN 154, switch 104 determines that the reconciliation is complete. Switch 104 then completes constructing its local MCACHE based on received information and synchronizes its forwarding information with the forwarding hardware of switch 104.

Exemplary Communication

Figure 2:
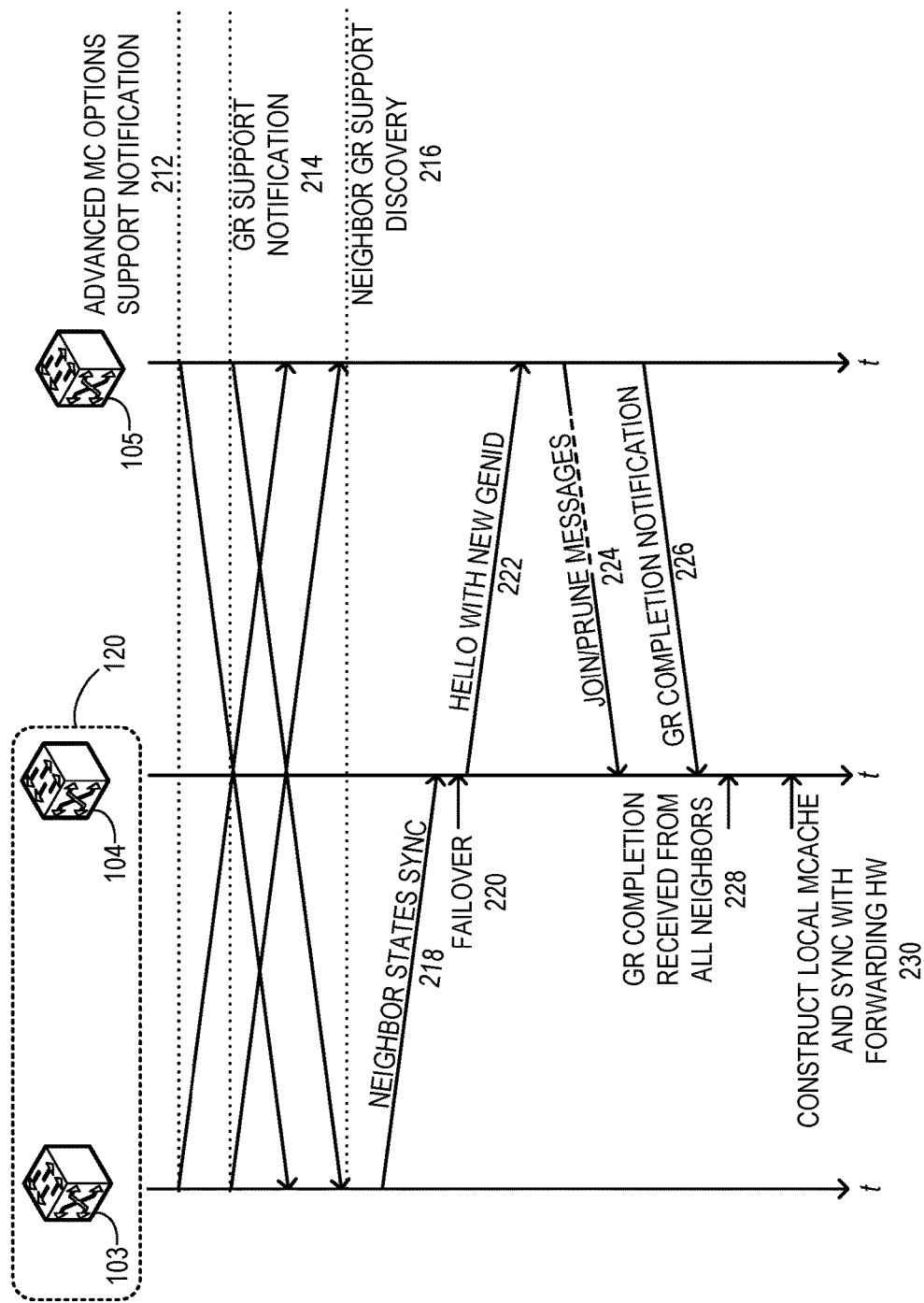
FIG. 2 illustrates an exemplary process of graceful recovery of a switch with high-availability support in a multicast distribution tree, in accordance with an embodiment of the present invention.

FIG. 2 illustrates an exemplary process of graceful recovery of a switch with high-availability support in a multicast distribution tree, in accordance with an embodiment of the present invention. During operation, active switch 103 of switch system 120, which also includes standby switch 104, sends an advanced multicast options support notification message to a neighbor switch 105 (operation 212). Switch 103 also sends a graceful recovery support notification message to switch 105 (operation 214). In the same way, switch 105 sends an advanced multicast options support notification message (operation 212) and a graceful recovery support notification message (operation 214) to switch 103. This allows switches 103 and 105 to discover their neighbor switches with graceful recovery support (operation 216).

Switch 103 synchronizes its neighbor states with switch 104 (operation 218), thereby allowing switch 104 to discover the neighbor switches with graceful recovery support. Suppose that switch 104 detects a failover (or an ISSU or a reboot) for switch 103 (operation 220). Upon detecting the failover, switch 104 sends a hello message with a new generation identifier to its neighbor switches, such as switch 105 (operation 222). If switch 103 is a standalone switch (i.e., does not have switch 104 as a standby switch), switch 103 does not synchronize its neighbor states with switch 104. Switch 103 then detects a local recovery event (e.g., an ISSU or a reboot) and sends the hello message to the neighbor switches.

Switch 105, in response, replays its MCACHE and sends the join/prune messages associated with the entries in the MCACHE (operation 224). Upon completing replaying its MCACHE, switch 105 sends a graceful recovery completion message to switch 104 (operation 226). When switch 104 receives a graceful recovery completion message from all neighbor switches (operation 228), switch 104 constructs the local MCACHE based on received messages and synchronizes with the local forwarding hardware (operation 230).

Message Formats

FIG. 3A illustrates an exemplary message indicating advanced multicast options support for a switch, in accordance with an embodiment of the present invention. In this example, an advanced multicast options support notification message 302 indicates whether a switch supports advanced multicast options. In some embodiments, message 302 is a PIM hello message with a predetermined option value. The message is then a multicast message and can be sent via a corresponding multicast tree. Message 302 can include message version 312 (e.g., a PIM version), a message type 314 (e.g., a "hello" message), and a checksum 318. Message 302 can also include a set of reserved bits 316. Message 302 includes an option type 320 indicating that message 302 is an advanced multicast options support notification message.

Message 302 also includes an option length 322, which indicates a length for an option value 324. In some embodiments, option type 320 uses an available value for a PIM hello message (e.g., 65001). Option value 324 includes a device key, which indicates whether the local device (e.g., switches 103 and 105 in FIG. 2) supports advanced multicast options. For example, the device key can be an organizationally unique identifier (OUI) associated with a device manufacturer, indicating that the manufacturer supports advanced multicast options. Under such circumstances, option length 322 can be 24, which is the length of an OUI in a MAC address. If the MAC address is used as a device key, option length 322 can be 48. In some embodiments, the device key is a key obtained from a key server (e.g., a license key obtained from a license server).

FIG. 3B illustrates an exemplary message indicating graceful recovery support for a switch, in accordance with an embodiment of the present invention. In this example, a graceful recovery support notification message 304 indicates whether a switch supports graceful recovery. In some embodiments, message 304 is a PIM hello message with a predetermined option value. The message is then a multicast message and can be sent via a corresponding multicast tree. Similar to message 302, message 304 includes a message version 312, a message type 314, and a checksum 318. Message 304 can also include a set of reserved bits 316.

Message 304 includes an option type 330 indicating that message 304 is a graceful recovery support notification message. Message 304 also includes an option length 332, which indicates a length for an option value 334. In some embodiments, option type 330 uses an available value for a PIM hello message (e.g., 65002). Since option type 330 is sufficient to indicate support for graceful recovery, option value 334 can be empty. Under such circumstances, option length 332 can be zero.

FIG. 3C illustrates an exemplary message indicating completion of a graceful recovery, in accordance with an embodiment of the present invention. In this example, a graceful recovery completion notification message 306 indicates whether a switch has completed playing its local MCACHE for a graceful recovery. In some embodiments, message 306 is a PIM hello message with a predetermined option value. The message is then a multicast message and can be sent via a corresponding multicast tree. Similar to message 302, message 306 includes a message version 312, a message type 314, a checksum 318, and a set of reserved bits 316. Message 306 can also include option type 320, option length 322, and option value 324. This allows message 306 to indicate that message 306 is part of the advanced multicast options. Furthermore, message 306 can also include option type 330, option length 332, and option value 334. This allows message 306 to indicate that message 306 is part of the graceful recovery.

Message 306 includes an option type 340 indicating that message 306 is a graceful recovery completion notification message. Message 306 also includes an option length 342, which indicates a length for an option value 344. In some embodiments, option type 340 uses an available value for a PIM hello message (e.g., 65003). Option value 344 includes a target identifier, which corresponds to the identifier of the recovering switch. It should be noted that, since message 306 is a multicast message, the target identifier is distinct from the destination address of message 306.

In the example in FIG. 1A, switch 105 includes the switch identifier of switch 103 as the target identifier in the option value 344 of message 146. In some embodiments, the target identifier is an IP address. Under such circumstances, option length 342 can be 32 or 128, which is the length of an IP address for IP versions 4 and 6, respectively. Since the message is a multicast message (e.g., a PIM hello message), switch 105 sends message 146 via the ports participating in a corresponding multicast tree. Neighbor switches 101, 102, 103, and 106 receive message 146 and check the target identifier in option value 344. However, only switch 103, whose identifier matches the target identifier, retrieves the message. Other neighbor switches determine that the message is not for them and discard the message.

Operations

Figure 4:
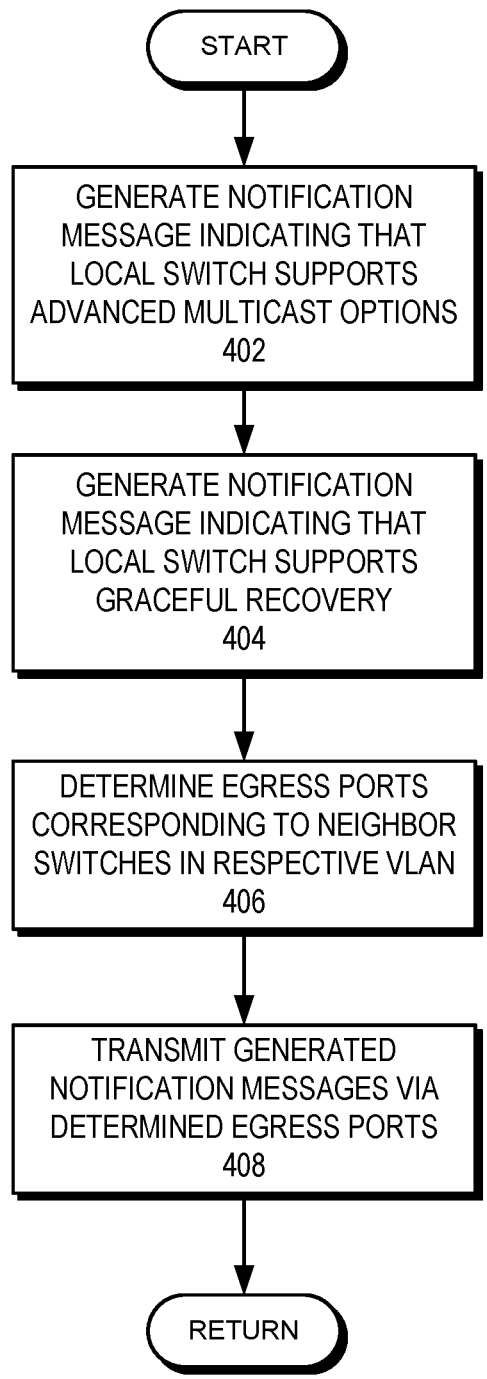
FIG. 4 presents a flowchart illustrating the process of a switch notifying graceful recovery support to neighbor switches in a multicast distribution tree, in accordance with an embodiment of the present invention.

FIG. 4 presents a flowchart illustrating the process of a switch notifying graceful recovery support to neighbor switches in a multicast distribution tree, in accordance with an embodiment of the present invention. During operation, the switch generates a notification message indicating that the local switch supports advanced multicast options (operation 402) and another notification message indicating that the local switch supports graceful recovery (operation 404). The switch determines egress ports corresponding to the neighbor switches in a respective VLAN (operation 406) and transmits the generated messages via the determined egress ports (operation 408). If the switch is in multiple VLANs, the switch generates and transmits the messages for each VLAN.

Figure 5A:
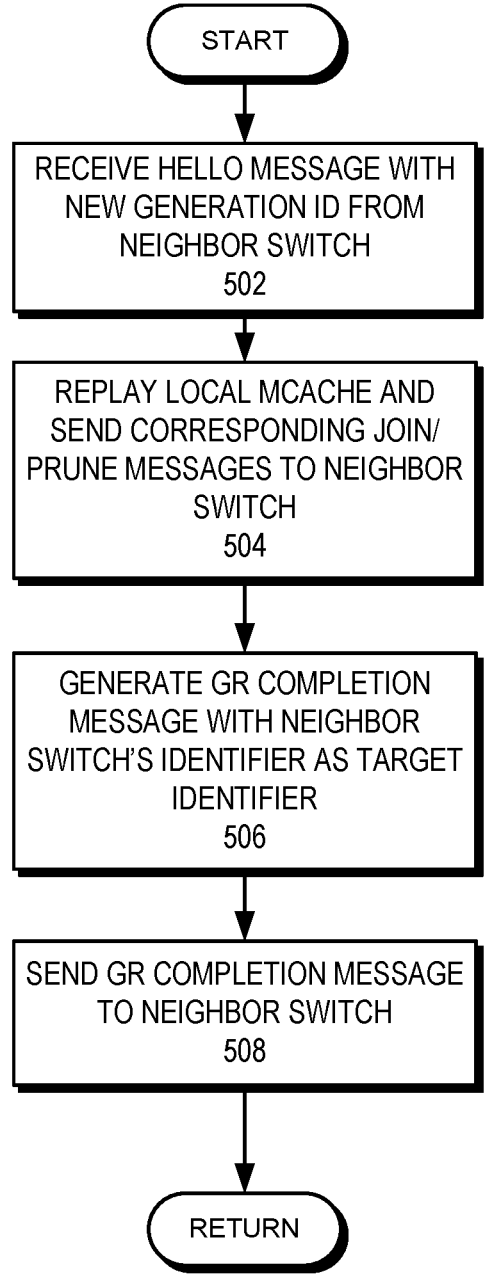
FIG. 5A presents a flowchart illustrating the process of a switch providing multicast states to a neighbor switch in a multicast distribution tree for facilitating a graceful recovery, in accordance with an embodiment of the present invention.

FIG. 5A presents a flowchart illustrating the process of a switch providing multicast states to a neighbor switch in a multicast distribution tree for facilitating a graceful recovery, in accordance with an embodiment of the present invention. During operation, the switch receives a hello message with a new generation identifier from a neighbor switch (operation 502). The switch then determines that the neighbor switch has rebooted; hence, the switch replays the local MCACHE and sends the corresponding join/prune messages to the neighbor switch (operation 504). These join/prune messages correspond to the respective multicast group specified in the MCACHE.

When the switch has finished replaying the MCACHE, the switch generates a graceful recovery completion message with the neighbor switch's identifier as the target identifier (operation 506). The switch then sends the graceful recovery completion message to the neighbor switch (operation 508). In some embodiments, the graceful recovery completion message is a PIM hello message. Since the message is a multicast message, the switch sends the message via the ports participating in a corresponding multicast tree. A respective neighbor switch receives this message. However, only the neighbor switch whose identifier matches the target identifier retrieves the message. Other neighbor switches determine that the message is not for them and discard the message.

Figure 5B:
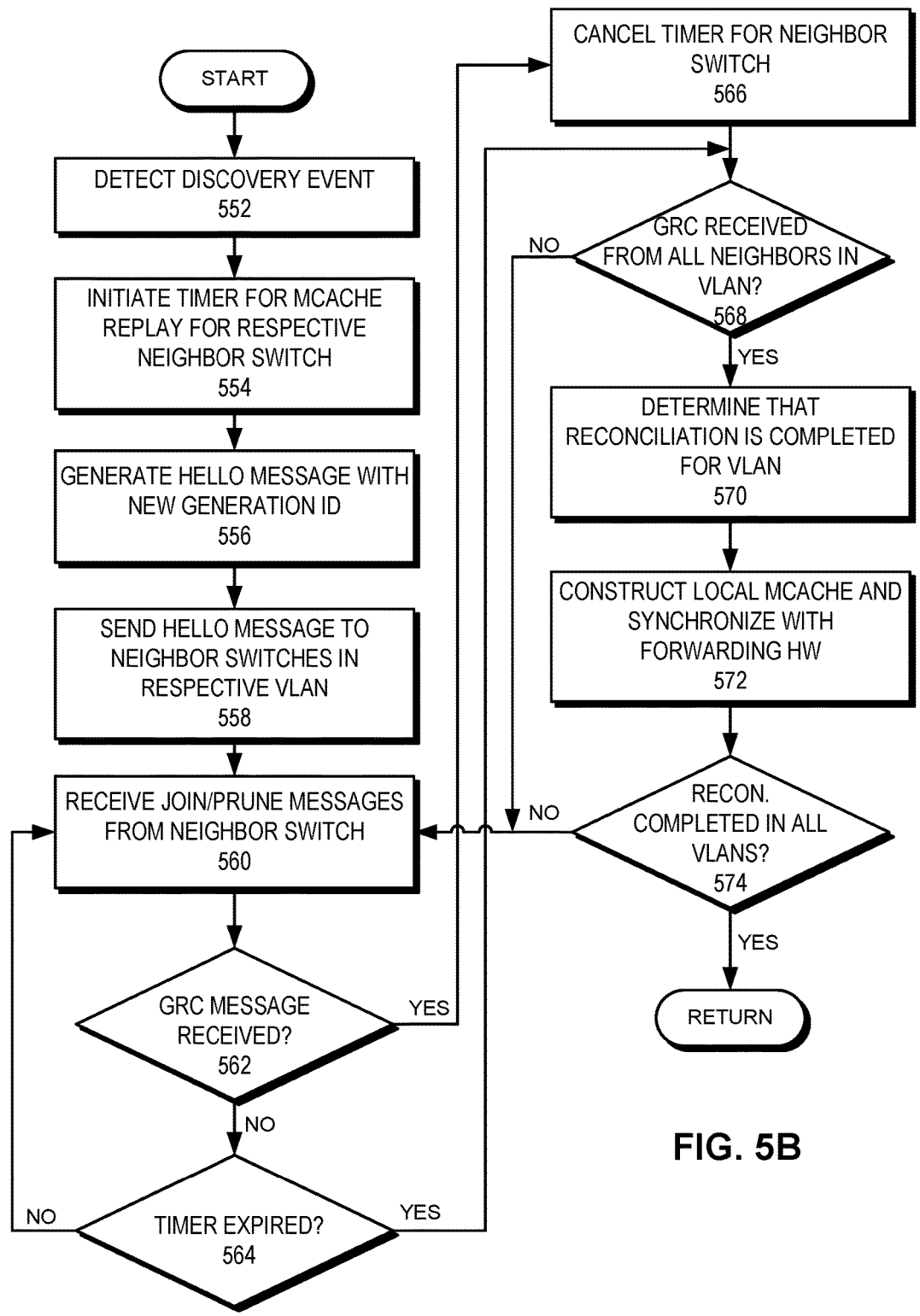
FIG. 5B presents a flowchart illustrating the process of a switch reconciling multicast states from neighbor switches in a multicast distribution tree for a graceful recovery, in accordance with an embodiment of the present invention.

FIG. 5B presents a flowchart illustrating the process of a switch reconciling multicast states from neighbor switches in a multicast distribution tree for a graceful recovery, in accordance with an embodiment of the present invention. During operation, the switch detects a discovery event (operation 552) and initiates a timer for the MCACHE replay for a respective neighbor switch (operation 554). The switch then generates a hello message with a new generation identifier (operation 556) and sends the hello message to the neighbor switches for a respective VLAN (operation 558). If the switch participates in a plurality of VLANs, the switch sends a hello message for the neighbors of a respective VLAN. As a result, a neighbor switch may receive a plurality of hello messages. The neighbor switch may respond to each hello message, or can consolidate the hello messages and/or responses.

The switch receives join/prune messages from a neighbor switch (operation 560) and checks whether the switch has received a graceful recovery completion message (operation 562). If not, the switch checks whether the timer for the neighbor has expired (operation 564). If the switch has not received a graceful recovery completion message and the timer has not expired, the switch continues to receive join/prune messages from the neighbor switch (operation 560). If the switch has received a graceful recovery completion message, the switch cancels the timer for the neighbor switch (operation 566). If the timer has expired (operation 564), the switch determines that the recovery has completed for that neighbor, which is equivalent of receiving the graceful recovery completion message.

If the timer has expired (operation 564) or upon canceling the timer for the neighbor switch (operation 566), the switch checks whether the switch has received a graceful recovery completion message from all neighbors in the VLAN (operation 568). If the switch has not received a graceful recovery completion message from all neighbors in the VLAN, the switch continues to receive join/prune messages from other neighbor switches (operation 560). If the switch has received a graceful recovery completion message from all neighbors in the VLAN, the switch determines that the reconciliation is complete for the VLAN (operation 570). The switch then constructs the local MCACHE and synchronizes the forwarding information with the forwarding hardware (operation 572). The switch checks whether the reconciliation is complete for all VLANs (operation 574). If not, the switch continues to receive join/prune messages from neighbor switches of other VLANs (operation 560).

Exemplary Switch

Figure 6:
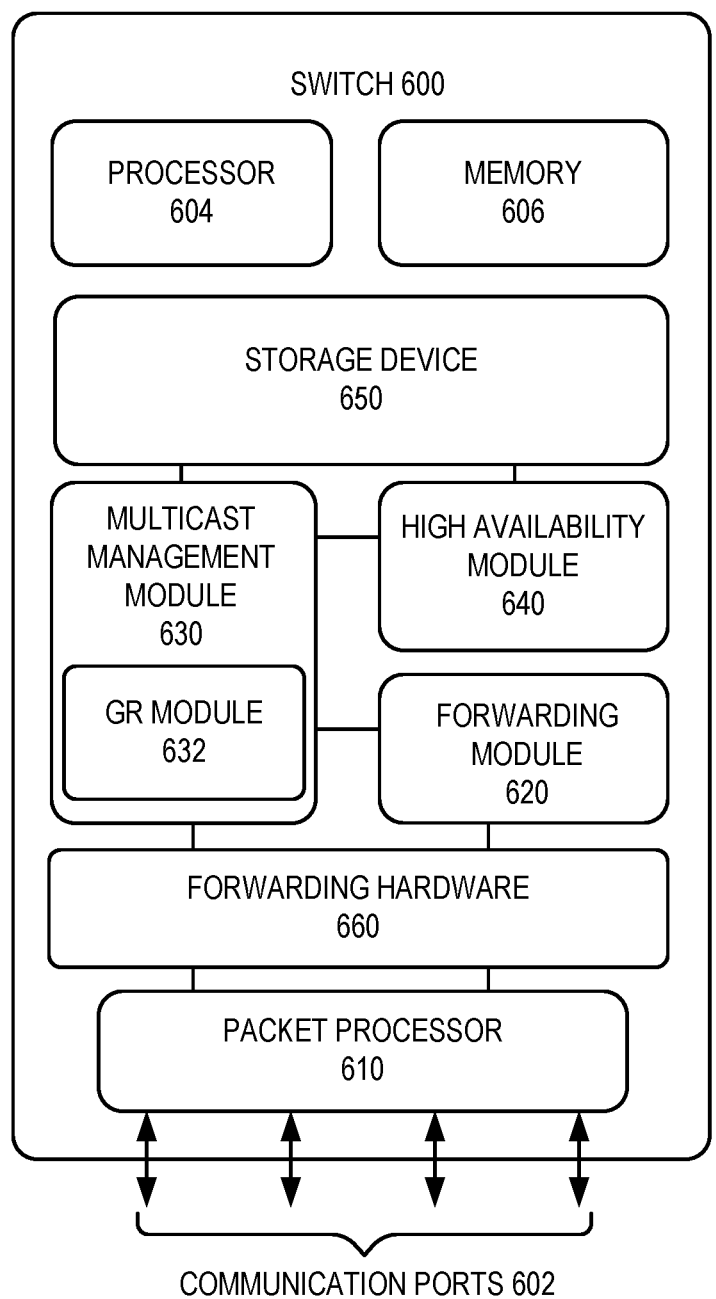
FIG. 6 illustrates an exemplary switch supporting graceful recovery in a multicast distribution tree, in accordance with an embodiment of the present invention.

FIG. 6 illustrates an exemplary switch supporting graceful recovery in a multicast distribution tree, in accordance with an embodiment of the present invention. In this example, a switch 600 includes a general purpose processor 604, a memory 606, a number of communication ports 602, a packet processor 610, a multicast management module 630, a graceful recovery module 632, a forwarding module 620, and a storage device 650. Processor 604 executes instructions stored in memory 606 to facilitate graceful recovery. Packet processor 610 receives and processes packets received via communication ports 602.

During operation, multicast management module 630 participates in a multicast tree of a multicast group. Graceful recovery module 632 determines a recovery event and constructs a message indicating the recovery event for a neighbor switch in a same VLAN. Graceful recovery module 632 then identifies a completion notification message (e.g., graceful recovery completion notification message 306 in FIG. 3C) from the neighbor switch and includes multicast information received from the neighbor switch in a local multicast database. In some embodiments, the switch stores the local multicast database in storage device 650. When graceful recovery module 632 identifies a completion notification message from a respective neighbor switch in the VLAN, forwarding module 620 synchronizes forwarding information in the local multicast database with forwarding hardware 660 of switch 600. Forwarding hardware 660 can be a CAM.

Graceful recovery module 632 also initiates and terminates timers for the neighbor switches. Graceful recovery module 632 also constructs different messages indicating the recovery event for different VLANs. Graceful recovery module 632 further constructs multicast notification messages (e.g., an advanced multicast options support notification message 302 in FIG. 3A) and graceful recovery notification messages (e.g., a graceful recovery support notification message 304 in FIG. 3B). In some embodiments, switch 600 is a standby switch of a remote switch, as described in conjunction with FIG. 1B. Switch 600 then includes a high availability module 640, which obtains neighbor state information from one or more synchronization messages from the remote switch.

Note that the above-mentioned modules can be implemented in hardware as well as in software. In one embodiment, these modules can be embodied in computer-executable instructions stored in a memory which is coupled to one or more processors in switch 600. When executed, these instructions cause the processor(s) to perform the aforementioned functions.

In summary, embodiments of the present invention provide a switch and a method for a graceful recovery. In one embodiment, the switch includes a processor, a storage device, a multicast management module, and a graceful recovery module. The multicast management module participates in a multicast tree of a multicast group. The graceful recovery module determines a recovery event and constructs a message indicating the recovery event for a second switch. The switch and the second switch belong to a first virtual local area network (VLAN). The graceful recovery module then identifies a completion notification message from the second switch indicating a completion of replaying multicast information stored in the second switch and includes multicast information received from the second switch in a local multicast database.

The methods and processes described herein can be embodied as code and/or data, which can be stored in a computer-readable non-transitory storage medium. When a computer system reads and executes the code and/or data stored on the computer-readable non-transitory storage medium, the computer system performs the methods and processes embodied as data structures and code and stored within the medium.

The methods and processes described herein can be executed by and/or included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The foregoing descriptions of embodiments of the present invention have been presented only for purposes of illustration and description. They are not intended to be exhaustive or to limit this disclosure. Accordingly, many modifications and variations will be apparent to practitioners skilled in the art. The scope of the present invention is defined by the appended claims.

What is claimed is:

1. A switch, comprising:
   multicast circuitry configured to participate in a multicast tree of a multicast group; and
   recovery circuitry configured to:
      in response to determining a recovery event in which the switch recovers after the multicast circuitry in the switch is temporarily unavailable to participate in the multicast tree of the multicast group, construct, for a second switch, a first message indicating the recovery event, wherein the switch and the second switch belong to a first virtual local area network (VLAN);
      obtain multicast information from one or more notification messages received from the second switch, wherein the multicast information is based on replaying multicast information stored in the second switch, the replaying multicast information includes receiving join/prune messages corresponding to entries for the switch that are stored in a memory of the second switch;
      receive a completion notification message from the second switch indicating a completion of the replaying of the multicast information at the second switch;
      include the multicast information received from the second switch in a local multicast database; and
      determine that reconciliation with the second switch is complete after receiving the completion notification message from the second switch.

2. The switch of claim 1, wherein the recovery circuitry is further configured to identify a respective completion notification message received from a corresponding neighbor switch in the first VLAN, wherein the respective completion notification message indicates a completion of a replaying of multicast information at the corresponding neighbor switch; and wherein the switch further comprises forwarding circuitry configured to synchronize forwarding information in the local multicast database with a forwarding hardware of the switch.

3. The switch of claim 1, wherein the recovery circuitry is further configured to, in response to identifying the completion notification message received from the second switch, terminate a timer for the second switch, wherein the timer represents a period of time the switch waits for receiving the multicast information from the second switch.

4. The switch of claim 1, wherein the recovery circuitry is further configured to construct a second message indicating the recovery event for a third switch, wherein the switch and the third switch belong to a second VLAN distinct from a first VLAN.

5. The switch of claim 1, wherein the recovery circuitry is further configured to construct for the second switch:
    a multicast notification message indicating that the switch supports advanced multicast options; and
    a graceful recovery notification message indicating that the switch supports construction and identification of the completion notification message.

6. The switch of claim 1, wherein the completion notification message is a Protocol-Independent Multicast (PIM) hello message, wherein the hello message includes an option type value indicating that the hello message is the completion notification message.

7. The switch of claim 1, wherein the completion notification message includes a switch identifier of the switch as a target identifier distinct from a destination address of the completion notification message, wherein the target identifier corresponds to a recovering switch.

8. The switch of claim 1, wherein the switch is a standby switch for a remote switch, and wherein the recovery event is an unavailability of the remote switch.

9. The switch of claim 8, wherein the switch further comprises high-availability circuitry configured to obtain neighbor state information from one or more synchronization messages from the remote switch, wherein the neighbor state information indicates whether the remote switch supports construction and identification of a completion notification message, which indicates a completion of a replaying of multicast information at the remote switch.

10. A method, comprising:
    participating, by a switch, in a multicast tree of a multicast group;
    in response to determining a recovery event in which the switch recovers after circuitry included in the switch is temporarily unavailable for the participating in the multicast tree of the multicast group, constructing, for a second switch, a first message indicating the recovery event, wherein the switch and the second switch belong to a first virtual local area network (VLAN);
    obtain multicast information from one or more notification messages received from the second switch, wherein the multicast information is based on replaying multicast information stored in the second switch, the replaying multicast information includes receiving join/prune messages corresponding to entries for the switch that are stored in a memory of the second switch;
    receiving a completion notification message from the second switch indicating a completion of the replaying of the multicast information at the second switch;
    including the multicast information received from the second switch in a local multicast database; and
    determining that reconciliation with the second switch is complete after receiving the completion notification message from the second switch.

11. The method of claim 10, further comprising:
    identifying a respective completion notification message received from a corresponding neighbor switch in the first VLAN, wherein the respective completion notification message indicates a completion of a replaying of multicast information at the corresponding neighbor switch; and
    synchronizing forwarding information in the local multicast database with forwarding hardware of the switch.

12. The method of claim 10, further comprising, in response to identifying the completion notification message received from the second switch, terminating a timer for the second switch, wherein the timer represents a period of time the switch waits for receiving the multicast information from the second switch.

13. The method of claim 10, further comprising constructing a second message indicating the recovery event for a third switch, wherein the switch and the third switch belong to a second VLAN distinct from a first VLAN.

14. The method of claim 10, further comprising constructing for the second switch:
    a multicast notification message indicating that the switch supports advanced multicast options; and
    a graceful recovery notification message indicating that the switch supports construction and identification of the completion notification message.

15. The method of claim 10, wherein the completion notification message is a Protocol-Independent Multicast (PIM) hello message, wherein the hello message includes an option type value indicating that the hello message is the completion notification message.

16. The method of claim 10, wherein the completion notification message includes a switch identifier of the switch as a target identifier distinct from a destination address of the completion notification message, wherein the target identifier corresponds to a recovering switch.

17. The method of claim 10, wherein the switch is a standby switch for a remote switch, and wherein the recovery event is an unavailability of the remote switch.

18. The method of claim 17, further comprising obtaining neighbor state information from one or more synchronization messages from the remote switch, wherein the neighbor state information indicates whether the remote switch supports construction and identification of a completion notification message, which indicates a completion of a replaying of multicast information at the remote switch.

19. A computing system, comprising:
    one or more ports;
    a processor; and
    a non-transitory computer-readable storage medium storing instructions which when executed by the processor cause the processor to perform a method, the method comprising:
    participating, by the computing system, in a multicast tree of a multicast group;
    in response to determining a recovery event in which the computing system recovers after circuitry in the computing system is temporarily unavailable for the participating in the multicast tree of the multicast group, constructing, for a second computing system, a first message indicating the recovery event, wherein the computing system and the second computing system belong to a first virtual local area network (VLAN);
    obtain multicast information from one or more notification messages received from the second computing system, wherein the multicast information is based on replaying multicast information stored in the second computing system, the replaying multicast information includes receiving join/prune messages corresponding to entries for the computing system that are stored in a memory of the second computing system;

receiving a completion notification message from the second computing system indicating a completion of the replaying of the multicast information at the second computing system;

including the multicast information received from the second computing system in a local multicast database; and determining that reconciliation with the second switch is complete after receiving the completion notification message from the second switch.

20. The computer system of claim 19, wherein the method further comprises:

identifying a respective completion notification message received from a corresponding neighbor computing system in the first VLAN, wherein the respective completion notification message indicates a completion of a replaying of multicast information at the corresponding neighbor computing system; and synchronizing forwarding information in the local multicast database with forwarding hardware of the computing system.

* * * * *